US008996510B2

(12) United States Patent
Karmarkar et al.

(10) Patent No.: US 8,996,510 B2
(45) Date of Patent: Mar. 31, 2015

(54) IDENTIFYING DIGITAL CONTENT USING BIORESPONSE DATA

(75) Inventors: Amit V. Karmarkar, Palo Alto, CA (US); Sharada Karmarkar, Palo Alto, CA (US); Richard R. Peters, Mill Valley, CA (US)

(73) Assignee: Buckyball Mobile, Inc., Palo Alto, CA (US)

( * ) Notice: Subject to any disclaimer, the term of this patent is extended or adjusted under 35 U.S.C. 154(b) by 219 days.

(21) Appl. No.: 13/297,018

(22) Filed: Nov. 15, 2011

(65) Prior Publication Data

US 2013/0054576 A1 Feb. 28, 2013

Related U.S. Application Data

(60) Provisional application No. 61/526,263, filed on Aug. 23, 2011, provisional application No. 61/535,985, filed on Sep. 17, 2011.

(51) Int. Cl.
*G06F 17/30* (2006.01)
*G06F 3/01* (2006.01)

(52) U.S. Cl.
CPC .......... *G06F 3/013* (2013.01); *G06F 17/30861* (2013.01)

USPC .......... 707/722; 707/706; 707/736; 707/758; 707/781; 715/753; 382/103; 705/14.42; 705/14.41; 705/14.43; 348/135; 348/571

(58) Field of Classification Search
USPC .......... 707/706, 722, 736, 758, 781, 999.003; 348/135, 571; 705/14.41–14.43; 382/103; 715/753

See application file for complete search history.

(56) References Cited

U.S. PATENT DOCUMENTS

| | | | | |
|---|---|---|---|---|
| 2008/0255949 | A1* | 10/2008 | Genco et al. | 705/14 |
| 2009/0111073 | A1* | 4/2009 | Stanley | 434/21 |
| 2010/0205541 | A1* | 8/2010 | Rapaport et al. | 715/753 |
| 2012/0236143 | A1* | 9/2012 | Weatherhead | 348/135 |
| 2012/0237084 | A1* | 9/2012 | De Lemos | 382/103 |
| 2013/0024272 | A1* | 1/2013 | Pradeep et al. | 705/14.42 |

* cited by examiner

*Primary Examiner* — Syling Yen

(57) ABSTRACT

In one exemplary embodiment, eye-tracking data may be collected from a user while the user is viewing a visual sensory stimulus. If the eye-tracking data includes an eye motion pattern exceeding a predetermined threshold, then the eye-tracking data may be used to identify a visual element within the user's field of view. In addition to the visual element, attributes and context information related to the sensory experience may be determined. Information related to the sensory experience may be stored in a repository for purposes of aiding the user's recollection of the visual element at a future time.

35 Claims, 13 Drawing Sheets

IDENTIFYING DIGITAL CONTENT USING BIORESPONSE DATA

CROSS-REFERENCE TO RELATED APPLICATIONS

This application claims priority from U.S. Provisional Application No. 61/526,263, filed Aug. 23, 2011 and U.S. Provisional Application No. 61/535,985 filed Sep. 17, 2011. The provisional applications are hereby incorporated by reference in their entirety for all purposes.

BACKGROUND

1. Field

This application relates generally to associating digital media with biological responses (bioresponse), and more specifically to a system for tagging elements within a digital media using eye-tracking data.

2. Description of Related Art

Biological response (bioresponse) data is generated by monitoring a person's biological reactions to visual, aural, or other sensory stimulus. A bioresponse may entail rapid simultaneous eye movements (saccades), eyes focusing on a particular visual element (e.g., word or graphic) for a time period (fixation), multiple eye fixations to a particular visual element within a time period (regression), heart rate (HR), galvanic skin response (GSR), pupil dilation, cortisol level, blood sugar level, rate of breathing, muscle tension (EMG), electroencephalography (EEG), or any other measurable biological reaction.

Bioresponse data may further include or be associated with detailed information on what prompted a response. For example, an eye-tracking system may indicate a coordinate location of a particular element within a visual stimulus—like a particular word in a phrase or figure in an image—and associate the particular visual element with a certain response. This association may enable a system to identify specific words, images, and other elements that elicited a measurable biological response from the person experiencing the visual stimulus. For instance, a person reading a book may quickly read over some words while pausing at others. Quick eye movements, or saccades, may then be associated with the words the person was reading. When the eyes simultaneously pause and focus on a certain word for a longer duration than other words, this response may then be associated with the particular word the person was reading. In another example, a recording microphone may be used together with a heart rate and galvanic skin response monitor to indicate a musical segment within an aural stimulus—like a particular song within a play list—and associate the song with the heart rate or galvanic skin response. The association of bioresponse data with particular sensory stimulus may be used for a variety of purposes.

Bioresponse data may be collected from a variety of devices and sensors that are becoming more and more prevalent today. Desktop, laptop, and tablet computers frequently include microphones and high-resolution cameras capable of monitoring a person's facial expressions, eye motion patterns, or verbal responses while viewing or experiencing sensory stimuli. Cellular telephones now include high-resolution cameras, proximity sensors, accelerometers, and touch-sensitive screens (galvanic skin response) in addition to microphones and buttons, and these "smartphones" have the capacity to expand the hardware to include additional sensors. Digital signage kiosks, such as advertisement billboards, may include high-resolution cameras that capture a viewer's proximity and facial expressions. User-wearable augmented reality goggles may contain sensors for tracking a user's eye positions with respect to the user's field of view.

BRIEF SUMMARY

In one exemplary embodiment, bioresponse data may be determined from a user while the user is experiencing a sensory stimulus. If the bioresponse data includes an eye motion pattern exceeding a threshold, then the bioresponse data may be used to identify the sensory element that is the subject of the eye motion pattern. The eye motion pattern may represent a fixation, saccades, regression, or the like. In addition to the sensory element, attributes and context data related to the sensory experience may be determined. Information related to the sensory experience may be stored in a repository, and may be used for purposes of aiding the user's recollection of the sensory element at a future time.

In another exemplary embodiment, bioresponse data may be determined from a user while the user is experiencing a sensory stimulus. If the bioresponse data includes a heart rate or galvanic skin response pattern exceeding a threshold, then the bioresponse data may be used to identify the sensory element that is the subject of the bioresponse pattern. The sensory element may be a portion of an aural stimulus. In addition to the sensory element, attributes and context data related to the sensory experience may be determined. Information related to the sensory experience may be stored in a repository, and may be used for purposes of aiding the user's recollection of the sensory element at a future time.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the broadest scope consistent with the claims.

This disclosure describes techniques that may collect bioresponse data from a user while the user experiences a sensory stimulus. Additional information related to the experience and/or the sensory stimulus may be determined according to the bioresponse data. The additional information may be recorded to memorialize the person's experience with the sensory stimulus (or element within the stimulus), and thus allow information related to the sensory experience to be recalled at a later date. In some embodiments, these techniques are used as part of a memory-aid application that helps users recall forgotten sensory stimuli.

Figure 1:
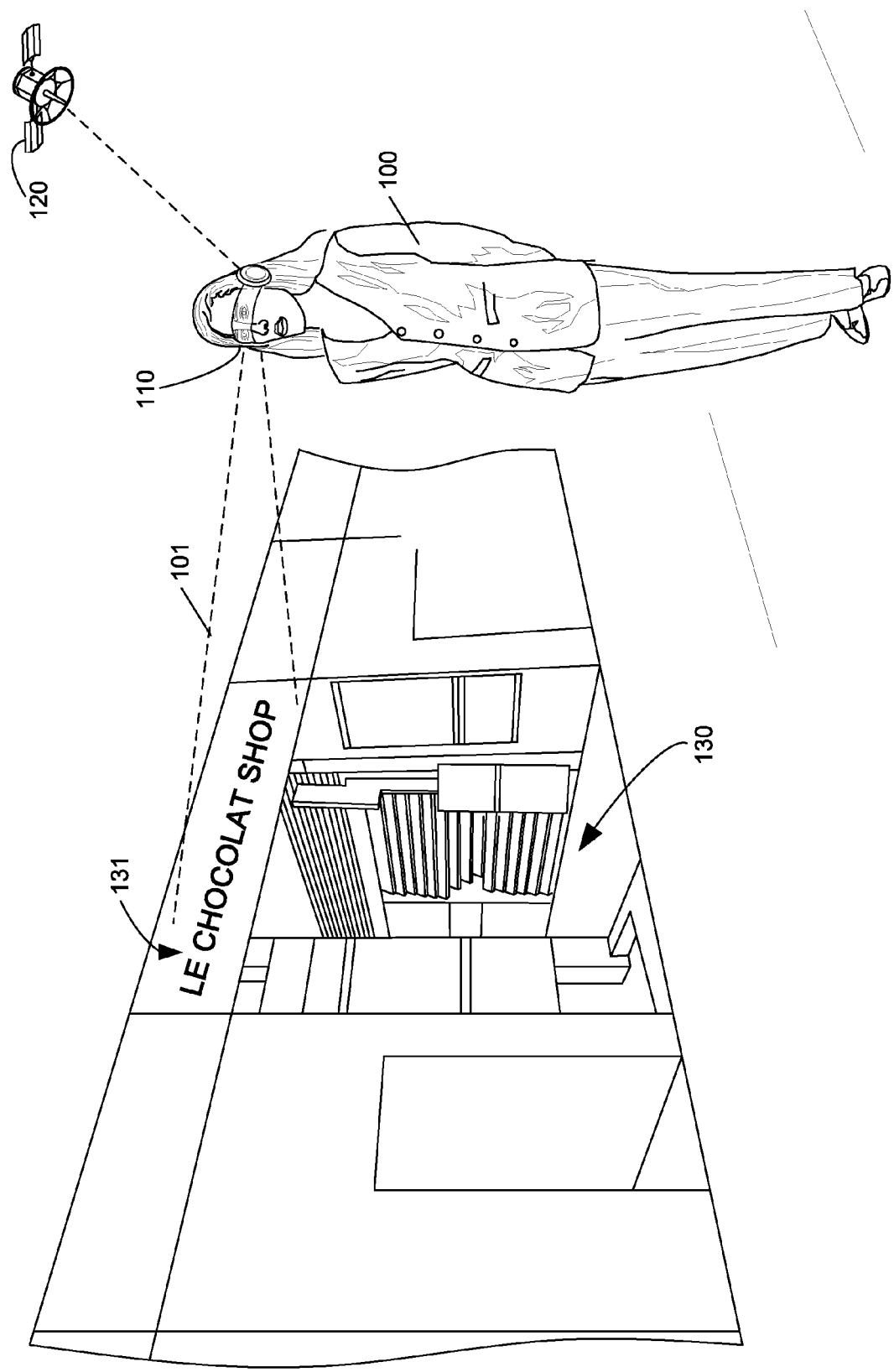
FIG. 1 illustrates exemplary components and an exemplary use of an eye-tracking system including an augmented reality goggle.

FIG. 1 illustrates an exemplary use of bioresponse data, in the form of eye-tracking data, for recording information about a user's sensory experience in one embodiment. As shown, the eyes of user 100 are fixated at store signage 131 of chocolate store 130, both of which are within the field of view of user 100. Augmented reality goggle 110 worn by user 100 may determine that the fixation at signage 131 exceeds a threshold time period (e.g., more than 750 ms). In response, augmented reality goggle 110 may identify and record information about the fixation. For example, augmented reality goggle 110 may identify and record an image of signage 131, the current date and time, and/or GPS location information via satellite(s) 120. The recorded information may be used, at a later date, to help user 100 recall the name of chocolate store 113. For example, user 100 may query the recorded information using a date, time, and/or GPS location information based on the user's estimate of time and location of the original sighting. The estimated date, time, and/or GPS location may then be used to retrieve information about sensory stimuli (e.g., signage 131) that most closely matches the estimated query parameters.

In another embodiment, bioresponse data may trigger the recording of information about a listener's experience with a specific aural stimulus. For example, a rise in heart rate and/or galvanic skin responses in response to a portion of radio programming being heard by the listener may be interpreted as indicating excitement towards a particular music segment. Heart rate and galvanic skin response data above a threshold may cause information associated with the specific music segment to be recorded. The music segment may be recorded, for example, via a microphone coupled with a heart rate and/or galvanic skin response sensor. The recorded information may be used, at a later date, to help the listener recall the particular music segment. For example, the listener may query a memory-aid application with the voice command: "what was the beautiful song that I heard last week at the Acme coffee house?" The memory-aid application may reply "Time to Say Goodnight by Andrea Bocelli" in response to the query according to the recorded information.

For purposes of this disclosure, the term field of view refers to information that may be seen by a person at a given moment, consistent with its ordinary meaning. Also, eye-tracking may include gaze-tracking. Further, eye-tracking data may include eye motion patterns that represent pauses in eye movement (i.e., periods of non-movement), such as fixations.

Process Overview

Figure 2:
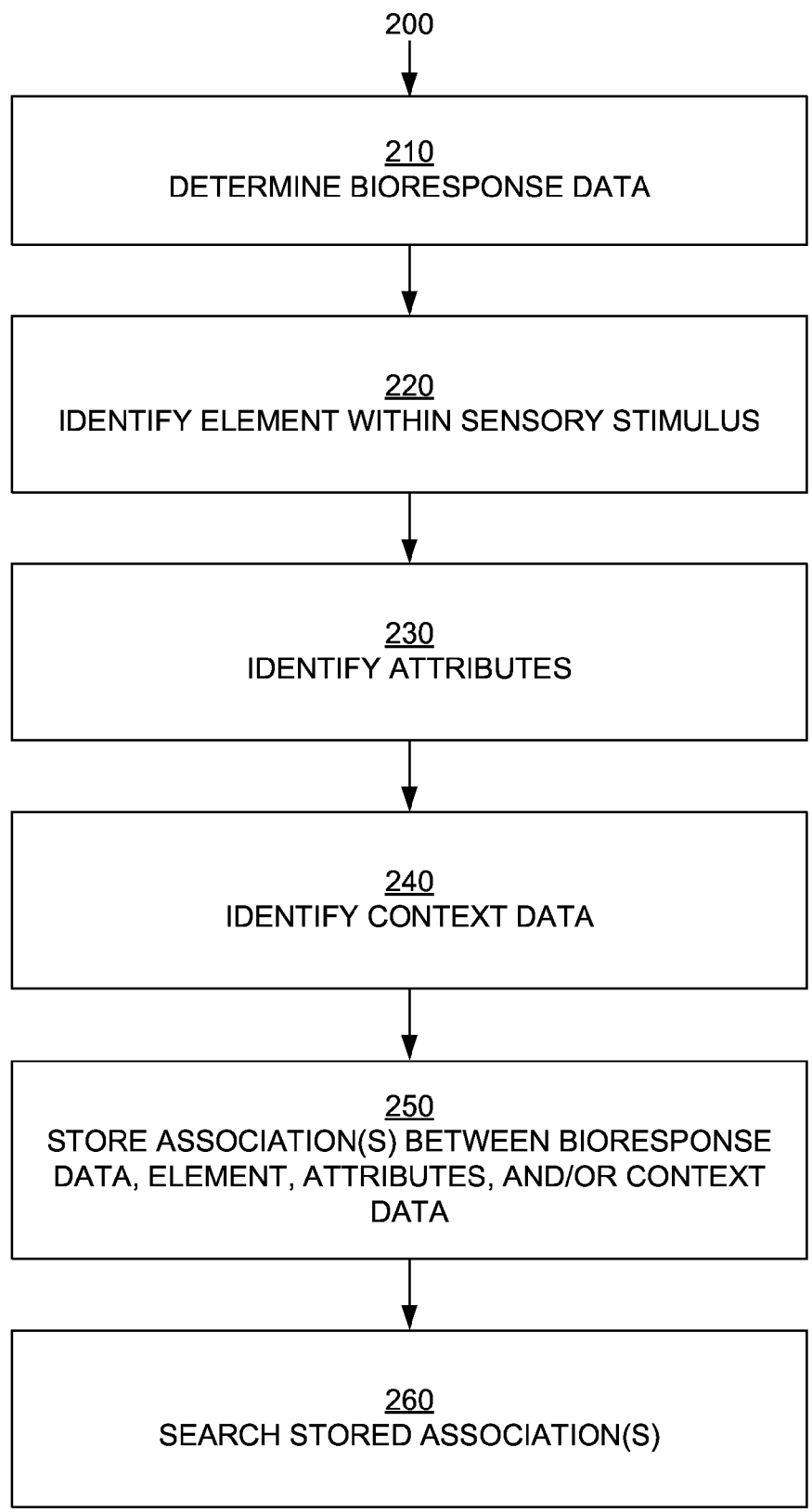
FIG. 2 is a block diagram illustrating an exemplary process for associating digital media content with using eye-tracking data.

FIG. 2 illustrates an exemplary process 200 for managing information related to a sensory stimulus according to bioresponse data. In some embodiments, process 200 may process bioresponse data in the form of eye-tracking data. In step 210, bio-response data, such as eye-tracking data of a user viewing a visual stimulus, may be obtained. Step 210 may be performed using component(s) of an eye-tracking system, such as a user-facing camera of a digital device, sensor(s) mounted onto an augmented reality goggle, a user-facing camera of a digital signage kiosk, or the like. Exemplary implementations of eye-tracking systems are discussed further below. The obtained eye-tracking data may represent the eye motion patterns of a user, such as fixations, saccades, regressions, or the like, while the user is viewing the visual stimulus. Eye-tracking data related to the viewing of multiple visual stimuli over a period of time may be obtained during step 210.

In step 220, the obtained eye-tracking data may be used to identify specific elements of interest within the overall visual stimulus experienced by the user. For example, if the obtained eye-tracking data indicates that the user's eyes are fixated on a particular coordinate location within a visual stimulus (e.g., in Cartesian or pixel coordinates), the subject of the fixation may be identified. Once identified, the element that is the subject of the user's fixation may be associated, or "tagged," using metadata.

In step 230, attributes related to the visual elements identified in step 220 may be determined. Attributes may represent additional information related to a visual element that tends to identify the visual element. For example, an image of a famous logo may be identified in step 220. An attribute of the famous logo may be the brand name associated with the logo.

In step 240, context data may be identified based on the eye-tracking data. Context data may represent additional information related to the context in which the user experienced a particular visual stimulus. For example, the current date, time, GPS location, and user profile that is active at the time when an eye-tracking data was obtained may be identified in step 240. As another example, the type of device (e.g., mobile phone, tablet computer, personal computer, etc.) used in obtaining the eye-tracking data may also be identified in step 240.

In step 250, the eye-tracking data, tagged visual elements, attributes, and/or context data obtained in steps 210-260 may be stored. In some embodiments, the storage may be a database, which may be indexed to optimize search performance. In step 260, a user interface (UI) may be provided to allow searches of the stored information. For example, a user may use the UI to search for the consumer brand name (e.g., identified during step 230) using the approximate date, time, and GPS location of the user's earlier sighting of the famous logo.

Steps may be added to or omitted from process 200 without straying from the scope of the claims. For example, in some embodiments, the obtaining of attribute data (step 230) may be omitted. As another example, in some embodiments, an additional step may process a user's search query in spoken format (e.g., "what was the name of the company logo that I saw on date at time at location?"), and may transcribe, using speech recognition, the spoken search query into search query language that may be processed by step 260.

Receive Bioresponse Data

Figure 3:
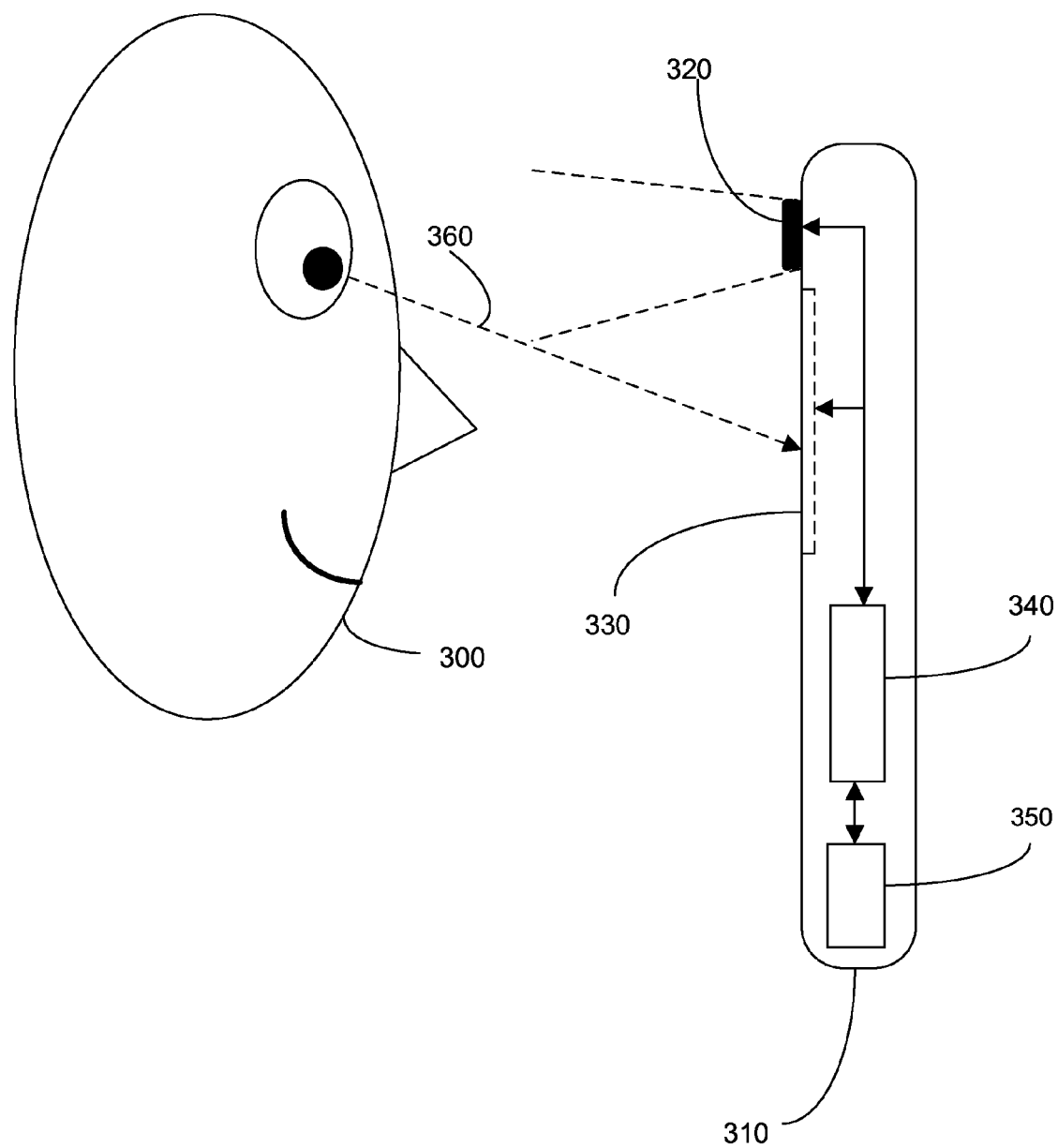
FIG. 3 illustrates exemplary components and an exemplary use of an eye-tracking system including a tablet computer.

FIG. 3 illustrates an example of obtaining bioresponse data, in some embodiments, from a user who is viewing a digital document on the display screen of a digital device. In this example, eye-tracking camera 340 of user device 310 may track the gaze 360 of user 300. Although illustrated here as a generic user device 310, the device may be a cellular telephone, personal digital assistant, tablet computer (such as an iPad®), laptop computer, desktop computer, or the like. Eye-tracking module 340 may utilize information from at least one digital camera 320 and/or an accelerometer 350 (or similar device that provides positional information of user device 310) to track the user's gaze 360. Eye-tracking module 340 may map eye-tracking data to information presented on display 330. For example, coordinates of display information may be obtained from a graphical user interface (GUI). Various eye-tracking algorithms and methodologies (such as those described herein) may be used to implement the example shown in FIG. 3.

In some embodiments, eye-tracking module 340 may use an eye-tracking method to acquire the eye motion pattern. In one embodiment, an example eye-tracking method may include an analytical gaze estimation algorithm that employs the estimation of the visual direction directly from selected eye features such as irises, eye corners, eyelids, or the like to compute a gaze 360 direction. If the positions of any two points of the nodal point, the fovea, the eyeball center, or the pupil center can be estimated, the visual direction may be determined.

In addition, a light may be included on the front side of user device 310 to assist detection of any points hidden in the eyeball. Moreover, the eyeball center may be estimated from other viewable facial features indirectly. In one embodiment, the method may model an eyeball as a sphere and hold the distances from the eyeball center to the two eye corners to be a known constant. For example, the distance may be fixed to 13 mm. The eye corners may be located (e.g., by using a binocular stereo system) and used to determine the eyeball center. In one exemplary embodiment, the iris boundaries may be modeled as circles in the image using a Hough transformation.

The center of the circular iris boundary may then be used as the pupil center. In other embodiments, a high-resolution camera and other image processing tools may be used to detect the pupil. It should be noted that, in some embodiments, eye-tracking module 340 may utilize one or more eye-tracking methods in combination. Other exemplary eye-tracking methods include: a 2D eye-tracking algorithm using a single camera and Purkinje image, a real-time eye-tracking algorithm with head movement compensation, a real-time implementation of a method to estimate gaze 360 direction using stereo vision, a free head motion remote eyes (REGT) technique, or the like. Additionally, any combination of any of these methods may be used.

Figure 4:
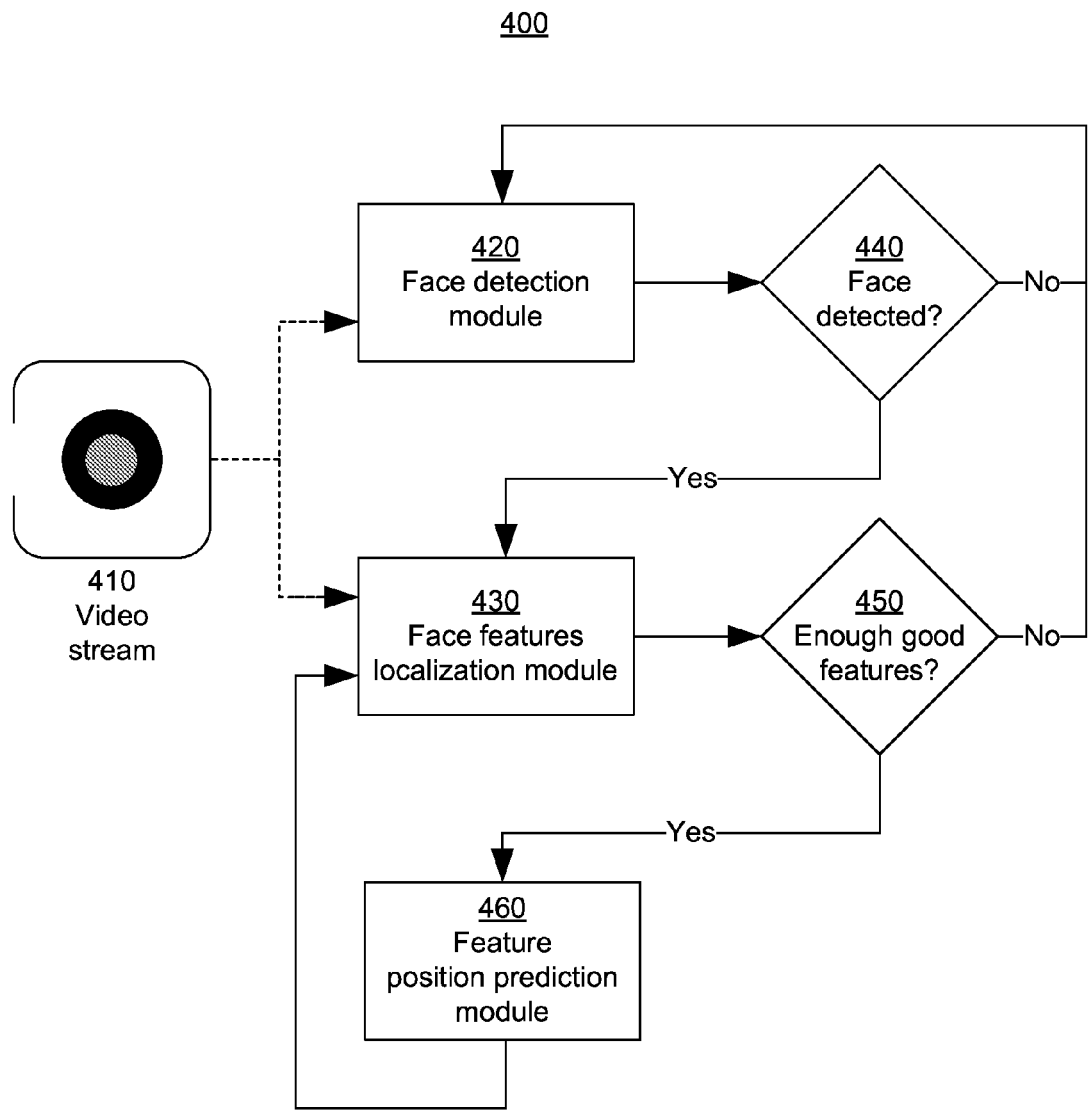
FIG. 4 is a block diagram illustrating exemplary components and an exemplary process for detecting eye-tracking data.

FIG. 4 illustrates exemplary components and an exemplary process 400 for detecting eye-tracking data. The gaze-tracking algorithm discussed above may be built upon three modules which interoperate to provide a fast and robust eyes and face-tracking system. Data received from video stream 410 may be input into face detection module 420 and face feature localization module 430. Face detection module 420, at junction 440, may check whether a face is present in front of the camera, receiving video stream 410.

In the case that a face is present, face detection module 420 may determine a raw estimate of the 2D position in the image of the face and facial features (e.g., eyebrows, eyes, nostrils, and mouth) and provide the estimate to face features localization module 430. Face features localization module 430 may find the exact position of the features. When the feature positions are known, the 3D position and orientation of the face may be estimated. In one embodiment, the 3D position and orientation may be estimated based on the method of Jeremy Y. Kaminski, Adi Shavit, Dotan Knaan, Mina Teicher, "Head Orientation and Gaze Detection from a Single Image," *Proceedings of International Conference of Computer Vision Theory and Applications* (2006), herein incorporated by reference in its entirety. Gaze direction may be processed by combining face orientation estimation and a raw estimate of eyeball orientation processed from the iris center position in the eyes (Jie Zhu, Jie Yang, "Subpixel Eye Gaze Tracking," *Fifth IEEE International Conference on Automatic Face and Gesture Recognition* (2002), herein incorporated by reference in its entirety).

If a face is not detected, control passes back to face detection module 420. If a face is detected but not enough facial features are detected to provide reliable data at junction 450, control similarly passes back to face detection module 420. Module 420 may try again after more data are received from video stream 410. Once enough good features have been detected at junction 450, control passes to feature position prediction module 460. Feature position prediction module 460 may process the position of each feature for the next frame. This estimate may be built using Kalman filtering on the 3D positions of each feature. The estimated 3D positions may then be back-projected to the 2D camera plane to predict the pixel positions of all the features. Then these 2D positions may be sent to face features localization module 430 to help it process the next frame.

The eye-tracking method is not limited to this embodiment. Any eye-tracking method may be used. For example, in another embodiment, the hardware setup may be used as described in Fabian Fritzer, Detlev Droege, Dietrich Paulus, "Gaze Tracking with Inexpensive Cameras," *Proceedings of the First Conference on Communication by Gaze Interaction* (2005), herein incorporated by reference. The hardware setup may consist of a high-sensitivity black and white camera (using, e.g., a Sony EXView HAD CCD chip), equipped with a simple near infrared (NIR) filter letting only NIR wavelengths pass and a set of infrared LEDs (IR-LEDs) to produce a corneal reflection on the user's cornea. The IR-LEDs may be positioned below instead of beside the camera. This positioning avoids shadowing the opposite eye by the user's nose and thus supports the usage of reflections in both eyes. To test different distances between the camera and the user, the optical devices may be mounted on a rack. In some embodiments, only three of the nine IR-LEDs mounted on the rack are used, as they already provide sufficient light intensity to produce a reliably detectable reflection on the cornea. One example of an implementation of this embodiment uses the OpenCV library that is available for Windows™ and Linux platforms. Machine-dependent parts may be encapsulated so that the program may be compiled and run on both systems.

When implemented using the OpenCV library, if no previous eye position from preceding frames is known, the input image may first be scanned for possible circles using an appropriately adapted Hough algorithm. To speed up operation, an image of reduced size may be used in this step. In one embodiment, limiting the Hough parameters (e.g., the radius) to a reasonable range determines the eye position more quickly. Next, the detected candidates may be checked against further constraints like a suitable distance between the pupils and a realistic roll angle between them. If no matching pair of pupils is found, the image may be discarded. For successfully matched pairs of pupils, sub-images around the estimated pupil center may be extracted for further processing. Especially due to interlace effects, but also caused by other influences the pupil center coordinates, pupils found by the initial Hough algorithm may not be sufficiently accurate for further processing. For exact calculation of a gaze direction (e.g., gaze direction 360 in FIG. 3), however, this coordinate should be as accurate as possible.

One possible approach for obtaining a usable pupil center estimation is actually finding the center of the pupil in an image. However, the invention is not limited to this embodiment. In another embodiment, for example, pupil center estimation may be accomplished by finding the center of the iris, or the like. While it provides a larger structure and thus higher stability for the estimation, the iris is often partly covered by the eyelid and thus not entirely visible. Also, its outer bound does not always have a high contrast to the surrounding parts of the image. The pupil, however, may be easily spotted as the darkest region of the (sub-)image.

Using the center of the Hough-circle as a base, the surrounding dark pixels may be collected to form the pupil region. The center of gravity for all pupil pixels may be calculated and considered to be the exact eye position. This value may also form the starting point for the next cycle. If the eyelids are detected to be closed during this step, the image may be discarded. The radius of the iris may now be estimated by looking for its outer bound. This radius may later limit the search area for glints. An additional sub-image may be extracted from the eye image, centered on the pupil center and slightly larger than the iris. This image may be checked for the corneal reflection using a simple pattern matching approach. If no reflection is found, the image may be discarded. Otherwise, the optical eye center may be estimated and a gaze direction (e.g., gaze direction 360 in FIG. 3) may be calculated. It may then be intersected with the monitor plane to calculate the estimated viewing point. These calculations may be done for both eyes independently. The estimated viewing point may then be used for further processing. For instance, the estimated viewing point may be reported to the window management system of a user's device as mouse or screen coordinates, thus providing a way to connect the eye-tracking method discussed herein to existing software.

A user's device may also include other eye-tracking methods and systems such as those included and/or implied in the descriptions of the various eye-tracking operations described herein. In some embodiments, the eye-tracking system may include an external system (e.g., a Tobbi Glasses eye tracker, Tobii T60 XL eye tracker, Tobii TX 300 eye tracker, Tobii X120 eye tracker, or similar eye-tracking system) communicatively coupled (e.g., with a cable, with a wireless connection, with an infrared connection, or the like) with the user device. In other embodiments, eye-tracking systems may be integrated into the device. For example, the eye-tracking system may be integrated as a user-facing camera with concomitant eye-tracking utilities installed in the device.

In some embodiments, the specification of the user-facing camera may be varied according to the resolution needed to differentiate the elements of a visual stimulus. For example, the sampling rate of a user-facing camera may be increased to accommodate a smaller display. In some embodiments, more than one user-facing camera (e.g., binocular tracking) may be integrated into the device to acquire more than one eye-tracking sample. The user device may include image processing utilities necessary to integrate the images acquired by the user-facing camera and then map the eye direction and motion to the coordinates of the digital document on the display. In some embodiments, the user device may also include a utility for synchronization of gaze data with data from other sources, e.g., accelerometers, gyroscopes, or the like. In some embodiments, the eye-tracking method and system may include other devices to assist in eye-tracking operations. For example, the user device may include a user-facing infrared source that may be reflected from the eye and sensed by an optical sensor such as a user-facing camera. The user device may also include one or more cameras for capturing images of a visual stimulus within the user's field of view.

Determine Significance of Bioresponse Data

Bioresponse data may be used to infer the state of mind of a person who is subjected to a sensory stimulus. One aspect of this disclosure is that a user's bioresponses may indicate the user's interest or attention in specific portions of a sensory stimulus. For instance, eye-tracking data can indicate particular patterns of eye motion that correspond to specific elements within a visual stimulus. At the same time, the particular eye motion patterns may suggest certain states of mind of the viewer. In this way, an eye-tracking system may identify a user's state of mind vis-à-vis specific elements within a larger visual stimulus (e.g., all information in the user's field of view).

For example, in some embodiments, a certain eye motion pattern (e.g., fixation of longer than 750 milliseconds) may be associated with a comprehension difficulty of a specific word within a page of text. Another eye motion pattern (e.g., regression) can indicate a user's interest in a particular visual element within a web site, such as an image, portion of an image, a phrase in the web site, or the like. A longer duration of gaze upon a visual element may indicate a greater degree of interest in that visual element over other visual elements. Thus, an eye-tracking system may identify specific visual elements within a user's field of view using eye-tracking data from the user, and associate the specific visual elements with states of mind as implied by eye motion patterns within the eye-tracking data.

It should be noted that stress may affect a person's bioresponse, and thereby affect the significance of an eye motion pattern. For instance, under normal circumstances, an average reader may comprehend a passage of text as well as an average tenth grade student. Further, the average reader may be able to process seven distinctive issues or features within the passage of text. However, under a high-stress environment, the same reader may comprehend at the equivalent of the sixth grade level. The same reader may also be able to process only three distinctive issue or features within the passage of text. Thus, an individual in a high-stress environment may read (or listen to) the initial portion of a message, but fail to recognize the relevance or importance of the message portion due to distractions, diminished cognitive capacity, and/or fatigue.

In response to reduced reading comprehension abilities, a distressed reader may read at a slower pace, which increases the average amount of time spent on each word within a passage of text. An eye-tracking system may interpret such an average increase in the user's focus on the words of the passage as significant fixations, and may undesirably identify many of the words of the passage as eliciting a significant bioresponse from the reader, when in fact, the reader was merely reading the entire passage slowly.

Therefore, in some embodiments, an eye-tracking system may vary the threshold(s) at which an eye motion pattern becomes significant. For example, an eye fixation may have to exceed 950 milliseconds in order to be interpreted as indicative of comprehension difficulty of a word, if an eye-tracking system recognizes that the reader is highly stressed. More generally, the threshold at which a bioresponse is considered significant may be adjusted using a "stressor" factor. Various sensors coupled to an eye-tracking system may help determine whether a user is under stress. For example, sensors coupled with an eye-tracking system may sense information indicative of stress, such as a user's heart rate, galvanic skin response, pupil dilation, cortisol level, blood sugar level, rate of breathing, and/or muscle tension. Sensors may also provide information that reduces the likelihood of false-positive indications of stress. For example, an accelerometer may help distinguish a stressed individual from an individual who is simply exercising, since both may have high heart rate and galvanic skin response levels but may differ in physical movement. Further, a cortisol sensor may help distinguish a stressed individual from an aroused individual, since both may have high heart rate levels but may differ in cortisol release levels. Information collected from these sensors may be used to determine an appropriate bioresponse threshold level for an eye-tracking system.

An advantage to using eye-tracking data, or more generally, bioresponse data, for associating specific elements of sensory stimuli with a user's state of mind is that eye-tracking data may be acquired on a substantially continuous and autonomous basis. That is, an eye-tracking system may track eye motion patterns without requiring the user to become aware of the eye-tracking system's operation. For example, a user may navigate various web pages via a web browser on a tablet computer. The tablet computer can include an eye-tracking system that passively acquires the user's eye-tracking data for the various web pages visited by the user without requiring further user input (except for the user's eye motions). Notably, eye-tracking data represents the user's actual eye motions with respect to the displayed content, and may be determined independent of timers that log a user's web browser operations, such as a timer that logs the duration of the user's visit to a web page. In addition, an eye-tracking system may track eye motion patterns independent of the particular type of visual stimulus being experienced by the user (e.g., whether the user is reading an e-book or browsing the Internet).

Turning back to FIG. 2, step 220 of process 200 may determine whether bioresponse data obtained from a user, for example eye-tracking data, exhibits specific eye motion patterns. If the eye-tracking data indicates a specific eye motion pattern (e.g., fixation, saccades, regressions, and/or any combination thereof), a corresponding visual element within the visual stimulus experienced by the user may be identified.

In some embodiments, the identification of a visual element may include identifying one or more coordinates (e.g., in Cartesian coordinates or pixels coordinates) corresponding to an electronic document that is being displayed on a display screen. In some embodiments, the identification of a visual element may include capturing a natural (e.g., not yet digitized) sensory stimulus into electronic format. For example, the signage of a brick-and-mortar store may be captured using a camera component of an eye-tracking system.

Once identified, the visual element may be associated, or "tagged," with metadata information. The metadata information may associate the visual element with the user, the user's eye-tracking data, or the like.

Identify Related Attributes and Context Data

In addition to metadata information, other information may be identified and be associated with a tagged visual element. Such information may include attribute and/or context data that are related to the tagged visual element.

With reference still to FIG. 2, step 230 of process 200 may analyze a tagged visual element for its attributes. An attribute may be information that tends to identify the visual element. For example, a tagged visual element may be a portion of a larger electronic document. In some embodiments, the larger electronic document may be parsed and analyzed for attribute data. Exemplary processes may include parsing the HTML attribute of an HTML element associated with the tagged visual element, such as the "ALT" tag of an HTML image element corresponding to the tagged visual element. Exemplary processes may also include parsing the filename of an image, analyzing text surrounding the visual element in the electronic document, identifying an overall theme (e.g., web page themes, paragraph themes, article themes, etc.) or the like. Further exemplary processes may include using the meanings of words within a tagged visual element as attribute data for the tagged visual elements. Word meanings may be provided by a table that matches terms to meanings, or may be provided by a third-party service that provides dictionary and/or encyclopedia definitions.

In some embodiments, techniques used by web crawlers to determine and rank attributes of an image, text and/or web page may be utilized to determine the certain attributes of tagged visual elements (e.g. search of a robots.txt file, analysis of outbound hyperlinks, analysis of HTML elements and/or other metadata tags, etc). In some embodiments, an electronic image representing the tagged visual element is processed to identify the color attributes of the electronic image as represented by numerical values in the image's matrix representation. In some embodiments, image recognition algorithms can be used to determine the content of an electronic image using various object recognition, identification, and/or detection algorithms. For example, facial recognition algorithms can be utilized to determine the identity of persons in an electronic image. Other operations that can be performed include: content-based image retrieval, pose estimation, and/or optical character recognition operations. In some embodiments, objects within a user's proximity may provide attribute information. For example, an object near the user may emit a signal using near-field communication (NFC) that identifies itself or another nearby object that is within the user's field of view. The contents of the self-identification signal may be used as attribute data.

With reference still to FIG. 2, step 240 of process 200 may identify context data based on eye-tracking data. Context data may be related to a user's interactive pattern with an eye-tracking system. For example, context data may represent environmental attribute such as date, time, temperature, location (e.g., GPS), or the like, at the time when eye-tracking data is obtained. Context data may also represent device information, such as the orientation, movement (e.g., acceleration), and/or identity of the device, as well as user profile information such as user name, identity, and/or web browsing history. In some embodiments, facial-recognition and image-recognition algorithms may be used to obtain a user's proximity, facial expressions, and/or head orientation with respect to a device.

Context data may be obtained from various sources. For example, in some embodiments, context data may be obtained from a sensor of a user's smartphone, from a sensor in the proximity of a user's laptop, from sensors of other mobile devices coupled with a user's device by a wireless network, or the like. Exemplary sensors may include temperature sensors, directional sensors, GPS sensors, accelerometers, or the like. Context data may also be obtained from memory accessible by the user's device. For example, date and time information may be retrieved via the internal clock of a user device, or from the memory of an external clock server via a network connection.

EXAMPLE

Tablet Computer

An exemplary device that may be used in carrying out at least portions of process 200 (FIG. 2) is discussed below. It should be recognized, however, that such discussion is not intended as a limitation on the scope of the present disclosure but is instead provided as a description of exemplary embodiments.

Figure 5:
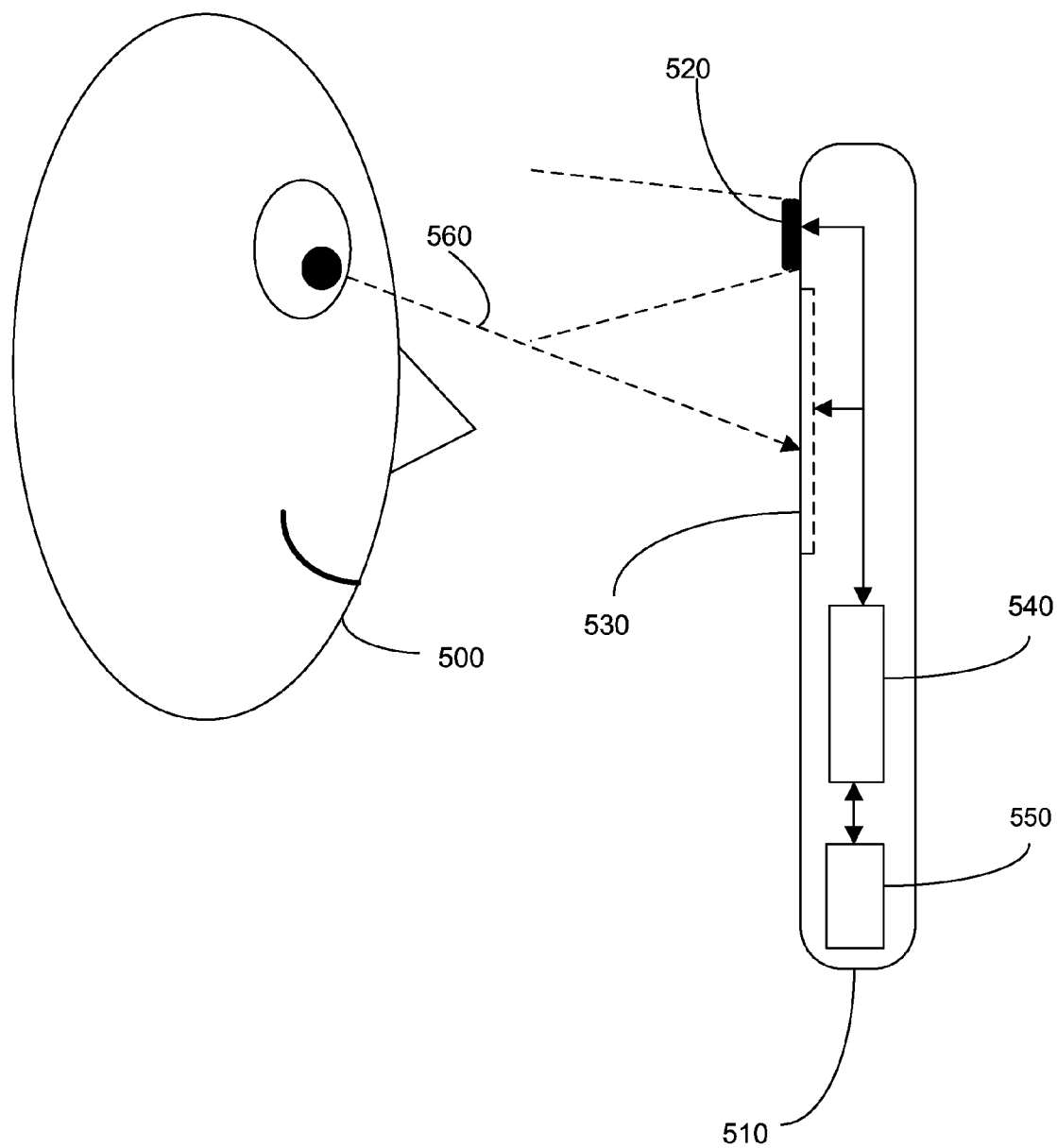
FIG. 5 illustrates exemplary components and an exemplary use of an eye-tracking system including a tablet computer.

FIG. 5 illustrates tablet computer 510 (such as an iPad®) that is used during process 200 (FIG. 2) in one embodiment. An eye-tracking system having components 530, 540, and 550 may be integrated into tablet computer 510. The integrated eye-tracking system may include user-facing camera 530 with concomitant eye-tracking utilities 540 and 550 installed in tablet computer 510. As shown, gaze 540 of user 500 is in the direction of display screen 520 of tablet computer 510.

Figure 6:
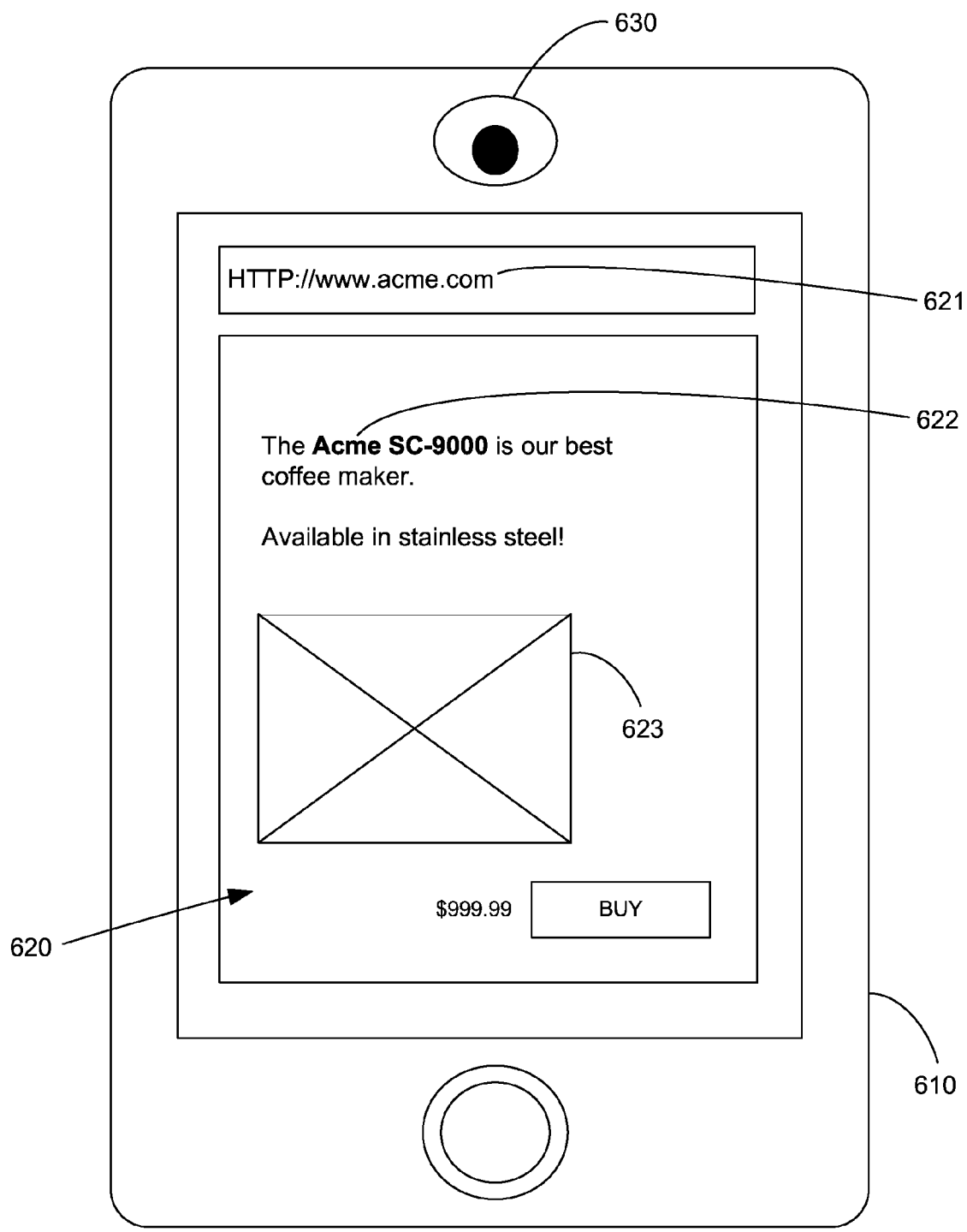
FIG. 6 is a front view of an exemplary tablet computer.

FIG. 6 illustrates exemplary tablet computer 610 with display screen 620. Display screen 620 shows a web page accessible from location 621 having text 622 and image 623 related to a coffee maker product called "Acme SC-9000." The web page may be a product page at the manufacturer's web site. A user of tablet computer 610 may gaze at text 622 and image 623.

In one example, the user may gaze at text 622, which includes the brand name (e.g., Acme) and model (e.g., SC-9000) of the coffee maker, for about 10 seconds. User-facing camera 630 of an eye-tracking system that is integrated with tablet computer 610 may obtain the user's eye-tracking data, and may determine that the eye-tracking data contains a gaze pattern that exceeds a threshold time period. In some embodiments, the threshold time period may be 750 milliseconds. The eye-tracking data may be interpreted as indicating the user's comprehension difficulty with "Acme," which may be an unfamiliar brand name. In response, the eye-tracking system may cause attributes and context data about the "Acme" to be obtained. For example, text adjacent to text 622 may be parsed and analyzed to determine that a theme of the overall paragraph of text is about "coffee makers." The term may also be associated with the description "stainless steel," which is included in the adjacent text. Further, a theme of the article may be consumer electronic goods. Further, date and timestamps, recent browsing histories, URL location 621, and their related metadata may be obtained by processes running on tablet computer 610. One or more combinations of the eye-tracking data obtained using camera 630, text 622, attributes and/or context data may be stored into a repository accessible by tablet computer 610. Further, other terms within text 622, such as a "SC-9000," may be processed similarly.

In another example, the user of tablet computer 610 may gaze at coffee maker image 623 for a time period of about 10 seconds. In response, the integrated eye-tracking system may cause image 623 to be tagged with metadata. Further, the integrated eye-tracking system may cause attributes of image 623, such as "coffee maker," "silver object," "electric item" to be obtained. In addition, the integrated eye-tracking system may cause context data to be obtained. Exemplary context data may include information about the current state of tablet computer 610, such as the user's identity, URL, location, time stamp, or the like. Exemplary context data may also include information obtainable from a sensor of tablet computer 610, such as a GPS location or device orientation (e.g., landscape or portrait). Exemplary context data may also include any other information obtainable through tablet computer 610, such as information about nearby devices (e.g., friendly devices, blocked devices, discoverable devices, etc.). One or more combinations of the eye-tracking data obtained using camera 630, image 623, attributes and/or context data may be stored into a repository accessible by tablet computer 610.

Storage and Retrieval of Data

Figure 7:
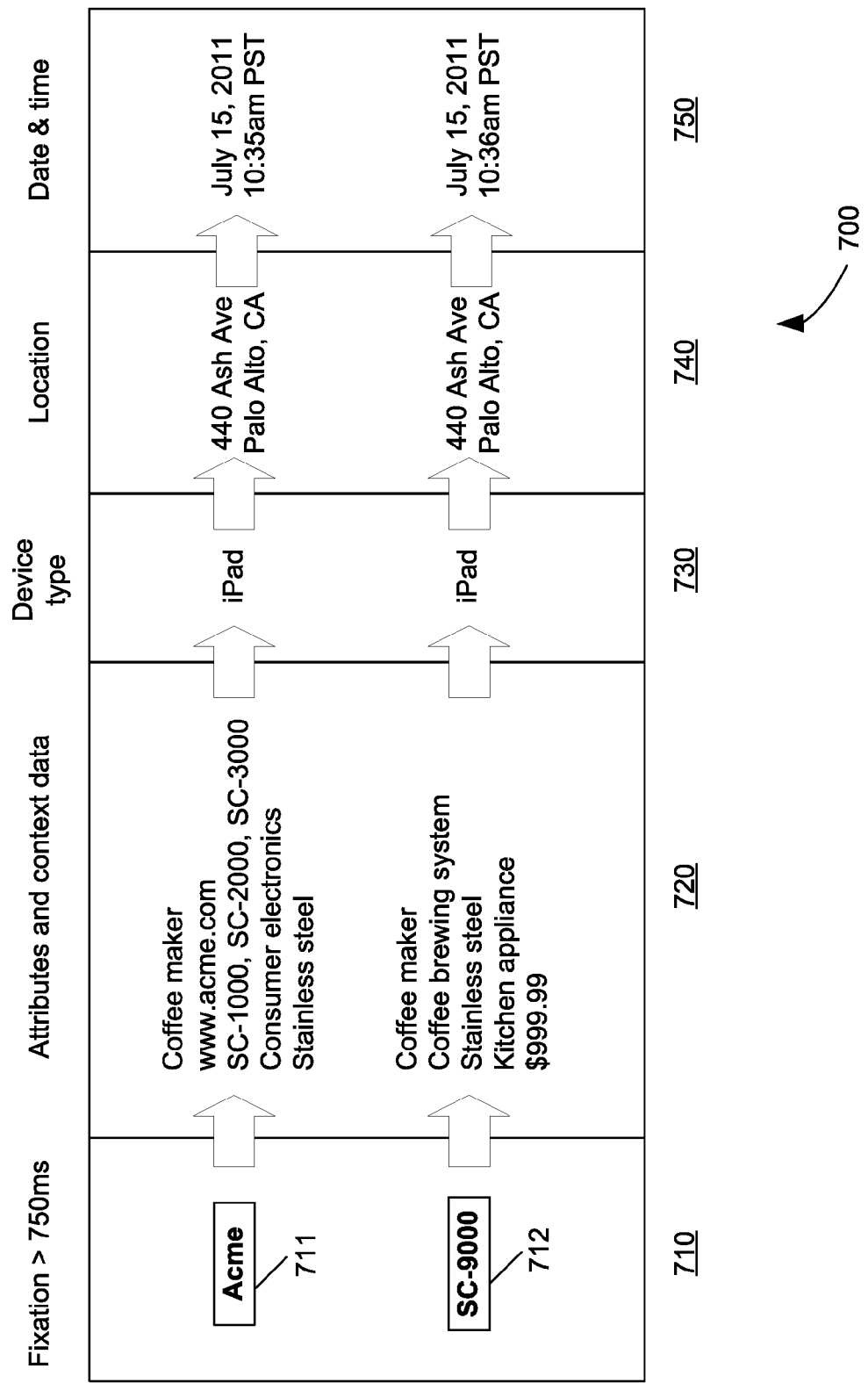
FIG. 7 is a table illustrating an exemplary storage of information associated with eye-tracking data.

Eye-tracking data, tagged elements, attributes and/or context data may be stored using a variety of models. FIG. 7 illustrates an exemplary table 700 which represents the storage of information provided by an eye-tracking system in one embodiment. In this embodiment, column 710 may store tagged visual elements, such as terms 711-712 which were obtained from the web page displayed on display screen 620 (FIG. 6). Column 720 may store attributes and context data related to terms 711-712. Column 730 may store information about tablet device 610 (FIG. 6). Column 740 may store the GPS location of tablet device 610 (FIG. 6), or more generally, the location of the eye-tracking system when the user fixated on terms 711-712. Column 750 may store the date and time at which the user fixated on terms 711-712.

FIG. 7 may correspond to a database table layout. Data contained within the database table (or more generally, a database) may be parsed, normalized, indexed, and/or ranked to optimize database performance. In addition, attributes can also be ranked according to such factors as the weight of eye-tracking data, correspondence to certain user attributes, quality of eye-tracking data, frequency of attribute acquisition and/or any combination of various ranking metrics. The database may thus include a history of the user's past interaction with various sensory stimuli.

Eye-tracking data, tagged visual elements, attributes and context data may be retrieved for a variety of purposes. In one embodiment, a search user interface (UI) may be provided for a user to search the database. A user may search the database to recall a visual element that was tagged from an earlier sensory stimulus that the user has since forgotten. For instance, a user may query against stored attributes and context data, which are associated with tagged visual elements. As an example, the user may query the database for a stainless steel coffee maker that was seen previously around a certain date and time. The search engine may return the terms "Acme SC-9000," a URL to a website containing the product description, or the like, based on the contents of a database table such as table 700 (FIG. 7) according to the user's search query.

In another embodiment, a "heat map" may represent a user's interest relative to visual elements within the user's field of view (e.g., a web page displayed on a device). A "heat map" generally refers to a graphical representation of data where the values taken by a variable in a two-dimensional table are represented as colors. In this embodiment, the coordinates of a heat map may correspond to the pixel coordinates of a web page document that was viewed by the user, and a color displayed at a given coordinate of the heat map may correspond to the duration of a user's fixation on a corresponding location of the web page document. The heat map may thus indicate the attention (or lack thereof) given by a user to different portions of a web page document.

In yet another embodiment, a user's queries against a database containing eye-tracking data may be profiled. In this embodiment, a system may maintain a record of a history of queries to an eye-tracking database by a user, and may identify specific patterns in a user's queries suggestive of memory problems. For example, the system may identify a pattern that indicates the user's problems in remembering a specific type of information, such as colors, numbers, images, text, or the like. The pattern may be further reconciled against large-scale statistical data to determine meaningful correlations. For example, together with user profile information such as the age and gender of the user, these operations can help determine if the user's pattern of search queries reflects a memory related medical condition.

A database may store the eye-tracking data of a single user or of multiple users. Further, a database containing eye-tracking data may also be integrated into a larger database containing other information. In some embodiments, a server may maintain a database containing eye-tracking data for multiple users. In some embodiments, the database (as well as ranking data, attributes, context data, and other metadata discussed herein) can be integrated into another database of digital media content (e.g., an image database, a database of web pages, an Internet database, another database generated by the embodiments described herein for another user or set of users such as those connected in a social graph, etc.) to augment search functionalities performed on the other database.

Digital Signage Kiosk

Another exemplary device that may be used in carrying out at least portions of process 200 (FIG. 2) is discussed below. Again, it should be recognized that the discussion is not intended as a limitation on the scope of the present disclosure but is instead provided as a description of exemplary embodiments.

Figure 8:
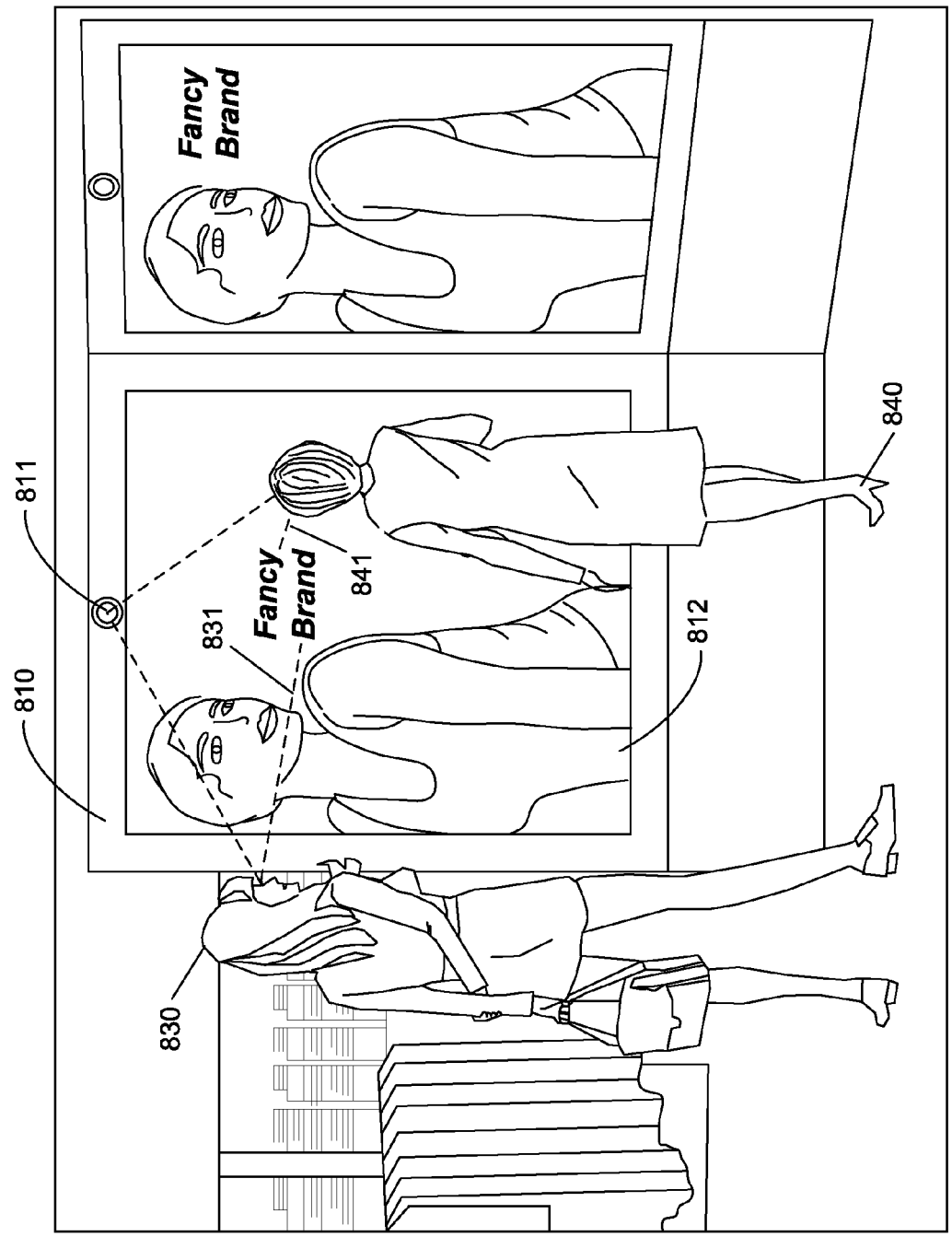
FIG. 8 illustrates exemplary components and an exemplary use of an eye-tracking system including a digital signage kiosk.

Turning to FIG. 8, in one embodiment, a digital signage kiosk 810 is used during process 200 (FIG. 2). An eye-tracking system having user-facing camera 811 may be integrated into digital signage kiosk 810. Display screen 812 of digital signage kiosk 810 may show an advertisement for a consumer products company. As shown, gaze 831 of viewer 830 and gaze 841 of viewer 840 may be in the direction of display screen 812 of digital signage kiosk 810.

User-facing camera 811 may detect the proximity of viewer 830 and viewer 840 and may obtain eye-tracking data from the viewers including their eye motion patterns. For example, user-facing camera 811 may capture that the eyes of viewer 830 have fixated at display screen 812 (or a portion thereof) for longer than a threshold time period. In some embodiments, the threshold time period is 750 milliseconds, and an eye-tracking system may interpret the fixation representing the viewer's interest in the goods or services being advertised on display screen 812. In another example, user-facing camera 811 may capture saccades in the eyes of viewer 840 while viewer 840 is gazing at display screen 812. An eye-tracking system may interpret the saccades as representing the viewer's interest in the goods or services being advertised. In yet another example, user-facing camera 811 may capture regressions in the eyes of viewer 830 in the direction of display screen 812. An eye-tracking system may interpret the regression as representing the viewer's interest in the goods or services being advertised.

In some embodiments, digital signage kiosk 810 may include other eye-tracking utilities (not shown in FIG. 8) in addition to user-facing camera 811. The additionally installed eye-tracking utilities may process and store the eye-tracking data captured by user-facing camera 811 consistent with the processes described herein. In other embodiments, digital signage kiosk 810 may communicate with an external server, and may transmit eye-tracking data to the external server for further processing and storage consistent with the processes described herein.

Further, in some embodiments, user-facing camera 811 may capture images of viewers such as viewer 840 in order to identify viewer 840. The captured image of a viewer may be processed using, for example, facial recognition algorithms in order to determine the identity of the viewer with whom eye-tracking data may be associated. In other examples, viewer 830 may sign-in to digital signage kiosk 810 to be identified. Once a viewer is identified, digital signage kiosk 810 may associate the obtained eye-tracking data with the viewer so that the user may perform later searching.

Figure 9:
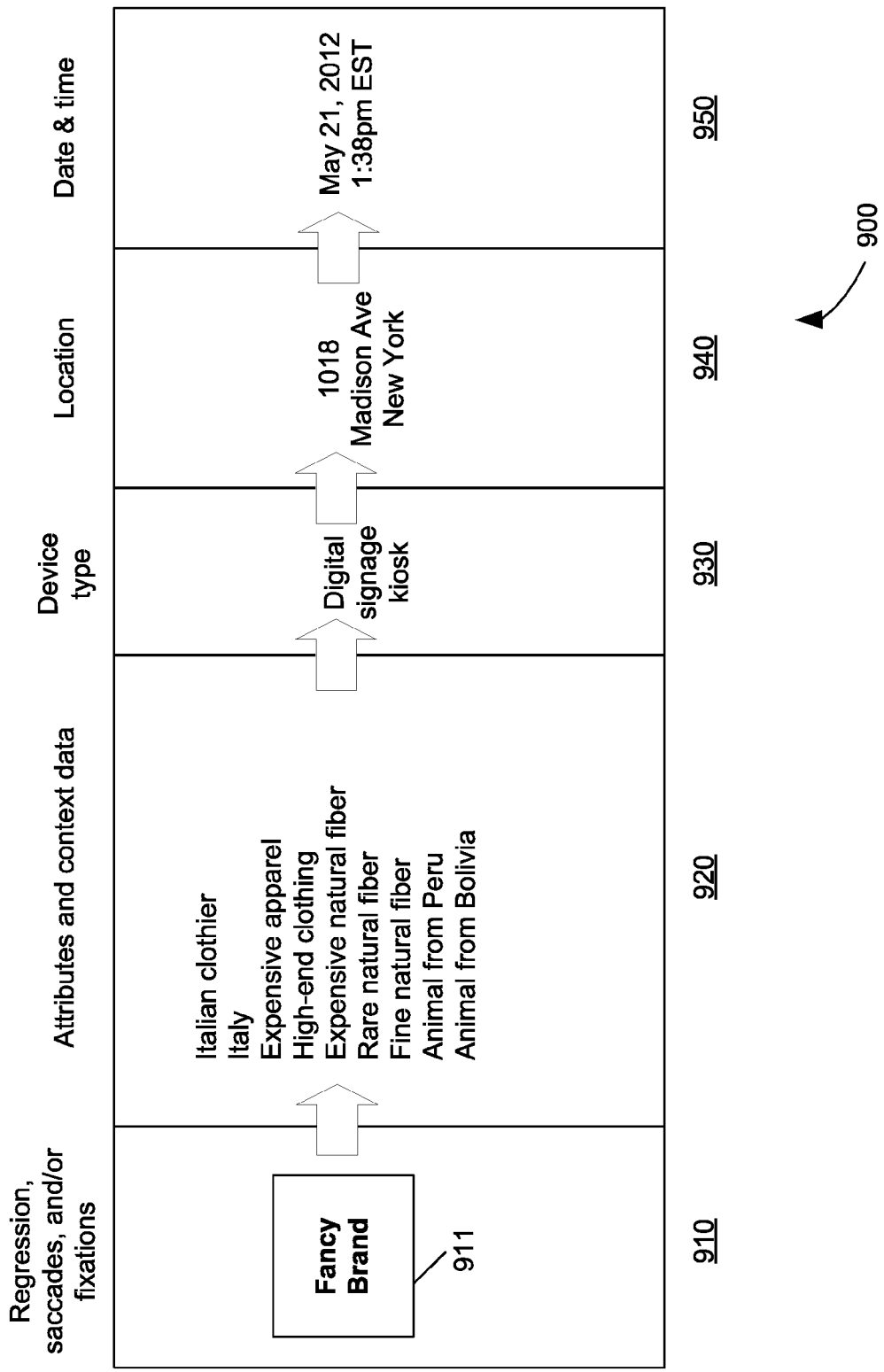
FIG. 9 is a table illustrating an exemplary storage of information associated with eye-tracking data.

FIG. 9 illustrates exemplary table 900 which represents the storage of information provided by an eye-tracking system in the present embodiment. In this embodiment, column 910 may store information about the display content of digital signage kiosk 810 (FIG. 8), such as the name of the consumer products company 911, whose advertisement was displayed on digital signage kiosk 810. Column 920 may store attributes and context data related to consumer products company 911. Column 930 may store information about digital signage kiosk 810 (FIG. 8). Column 940 may store the location of digital signage kiosk 810 (FIG. 8). Column 950 may store the date and time at which the viewers viewed digital signage kiosk 810 (FIG. 8).

Augmented Reality Goggle

Another exemplary device that may be used in carrying out portions of process 200 (FIG. 2) is discussed below. Again, it should be recognized that the discussion is not intended as a limitation on the scope of the present disclosure, but is instead provided as a description of exemplary embodiments.

Turning back to FIG. 1, in one embodiment, an augmented reality goggle 110 is used during process 200 (FIG. 2). As shown, gaze 101 of shopper 100 is in the direction of signage 131 of chocolate shop 130. Augmented reality goggle 110 may include a forward-facing camera configured to capture a digital image of information within the field of view of viewer 100, as well as a user-facing imaging device configured to obtain eye-tracking data from viewer 100, including the viewer's eye motion patterns. In some embodiments, the eye motion patterns obtained by augmented reality goggle 1010 may include fixations, saccades, and/or regressions of the eyes of viewer 1000. An eye-tracking system may interpret the fixations, saccades, and/or regressions as representing the viewer's interest in the subject of the pattern of eye motion.

In some embodiments, augmented reality goggle 110 may obtain contextual information related to the user's experience of a visual stimulus. For example, augmented reality goggle 110 may receive GPS information from satellite(s) 120 that indicate the user's location at the time of the viewing of the visual stimulus. Augmented reality goggle 110 may also maintain the date and time of the user's viewing of the visual stimulus, as well as the identity of viewer 110 such that the eye-tracking data may be associated with viewer 110 for later searching.

Exemplary System Architecture

Figure 10:
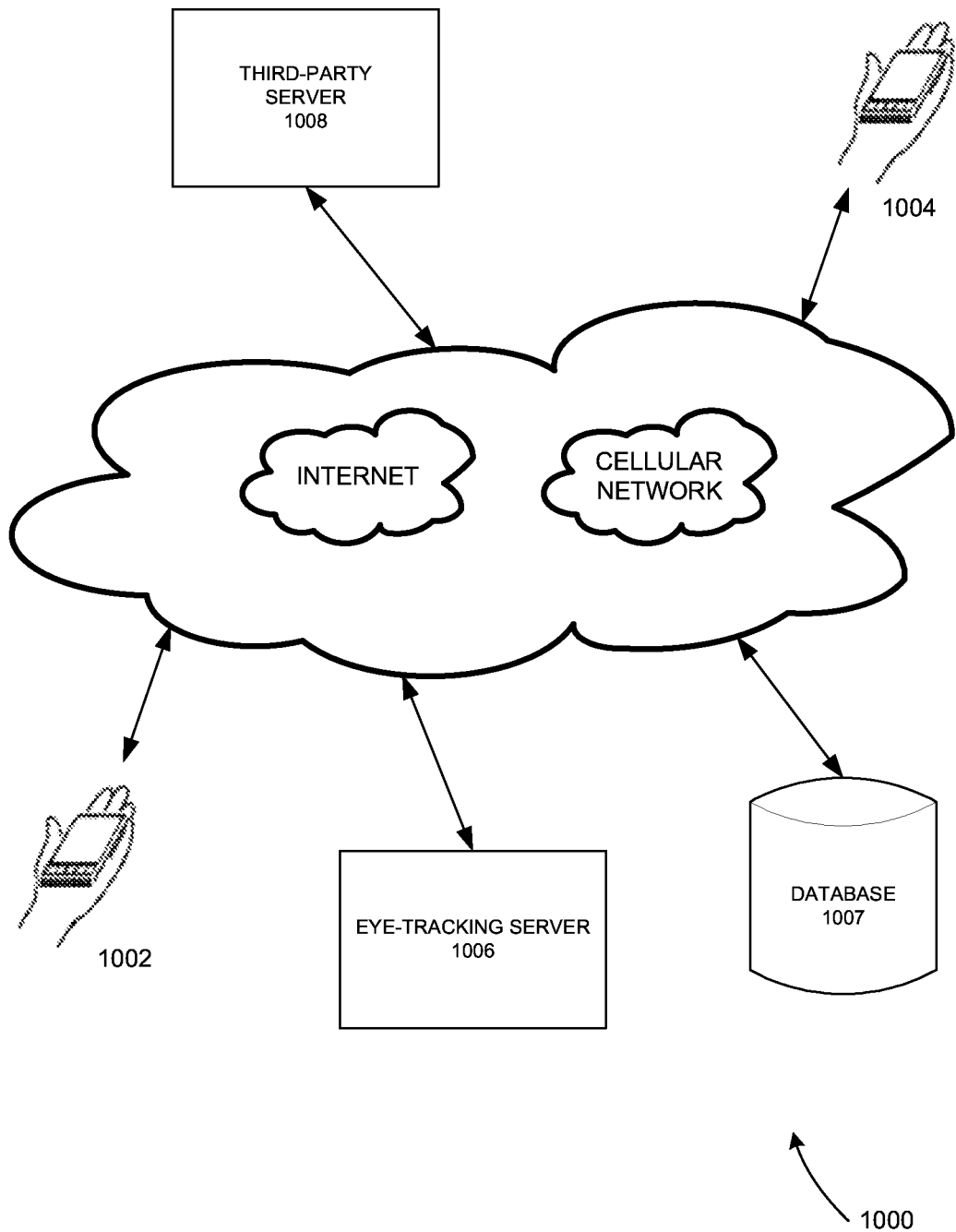
FIG. 10 is a block diagram illustrating components of an exemplary eye-tracking system according to some embodiments.

FIG. 10 illustrates an exemplary messaging service system 1000 in which one or more embodiments may be implemented. Communication network(s) 1000 may include any suitable circuitry, device, system, or combination of these operatives to create communications network 1000. For example, communication network 1000 may include a wireless communications infrastructure including communications towers and telecommunications servers, an IP network, or the like. Communication network 1000 may provide wireless communications using any suitable short-range or long-range communications protocol. In some embodiments, communication network 1000 may support Wi-Fi (e.g., an 802.11 protocol), Bluetooth™, high frequency systems (e.g., 900 MHz, 2.4 GHz, and 5.6 GHz communication systems), infrared systems, other relatively localized wireless communication protocols, or any combination thereof. In some embodiments, communication network 1000 may support protocols used by wireless and cellular phones and personal email devices. Such protocols may include, for example, GSM, GSM plus EDGE, CDMA, UMTS, quad-band, and other cellular protocols. In another example, a long-range communications protocol may include protocols for placing or receiving calls using Voice over Internet Protocol (VoIP). Furthermore, in some embodiments, communication network 1000 may include an Internet-Protocol (IP) based network such as the Internet. Communications network 1000 operatively couples the various computer systems of FIG. 10, such as the mobile devices 1002 and 1004, the eye-tracking server 1006 and the third-party server 1008, as well as other servers and devices (e.g., MSC, SMSC, gateways, or the like) not shown for purposes of clarity.

Mobile devices 1002 and 1004 may include mobile computing devices (e.g., smart phones, wireless handheld devices, tablet computers) such as the devices described herein. Mobile devices 1002 and 1004 may include smartphone capabilities such as a web browser, an SMS application, an MMS application, an EMS application, other types of text messaging applications (e.g., IMS), cellular telephony, an Internet telephony application (e.g., VoIP), or the like.

Mobile devices 1002 and 1004 may include an eye-tracking authentication application. In some embodiments, the eye-tracking authentication application may perform process 1000 of FIG. 10. In some embodiments, the eye-tracking authentication application may use eye-tracking data to authenticate a user. For example, an eye-tracking authentication operation may be performed before a user changes the state of the mobile device (e.g., place the mobile device in an "on" or "unlocked" state), perform certain actions with the mobile device, access certain data stored in the mobile device, access third-party server 1008, or the like. Mobile devices 1002 and 1004 may perform eye-tracking authentication locally, or in conjunction with an external server. For example, an eye-tracking authentication application running on mobile device 1002 and 1004 may transmit and/or receive authentication data to and/or from eye-tracking server 1006. Mobile devices 1002 and 1004 may also utilize eye-tracking server 1006 to scale the processing and data storage associated with authentication operations as well.

In some embodiments, eye-tracking server 1006 may include software functionalities configured to receive eye-tracking data, user data, and/or digital media data. Eye-tracking server 1006 may receive eye-tracking data from various sources including mobile devices 1002 and 1004. Eye-tracking server 1006 may also include software functionalities configured to request eye-tracking data, user data, and/or digital media data. If a set of needed eye-tracking data is not received by eye-tracking server 1006, eye-tracking server 1006 may request an appropriate source for the eye-tracking data that is needed. Eye-tracking server 1006 may provide metadata tags to be associated with elements of sensory stimuli during process 200 (FIG. 2). In some embodiments, the association may be performed by a client application in the mobile device that acquired the eye-tracking data from a user. Eye-tracking server 1006 may also perform the operations described in the various embodiments herein, such as data normalization, parsing, data storage, database queries, web crawling, obtaining attributes of elements (i.e. visual or aural components) of digital media and the like. Eye-tracking server 1006 may also include a search engine for querying database 1007.

Figure 11:
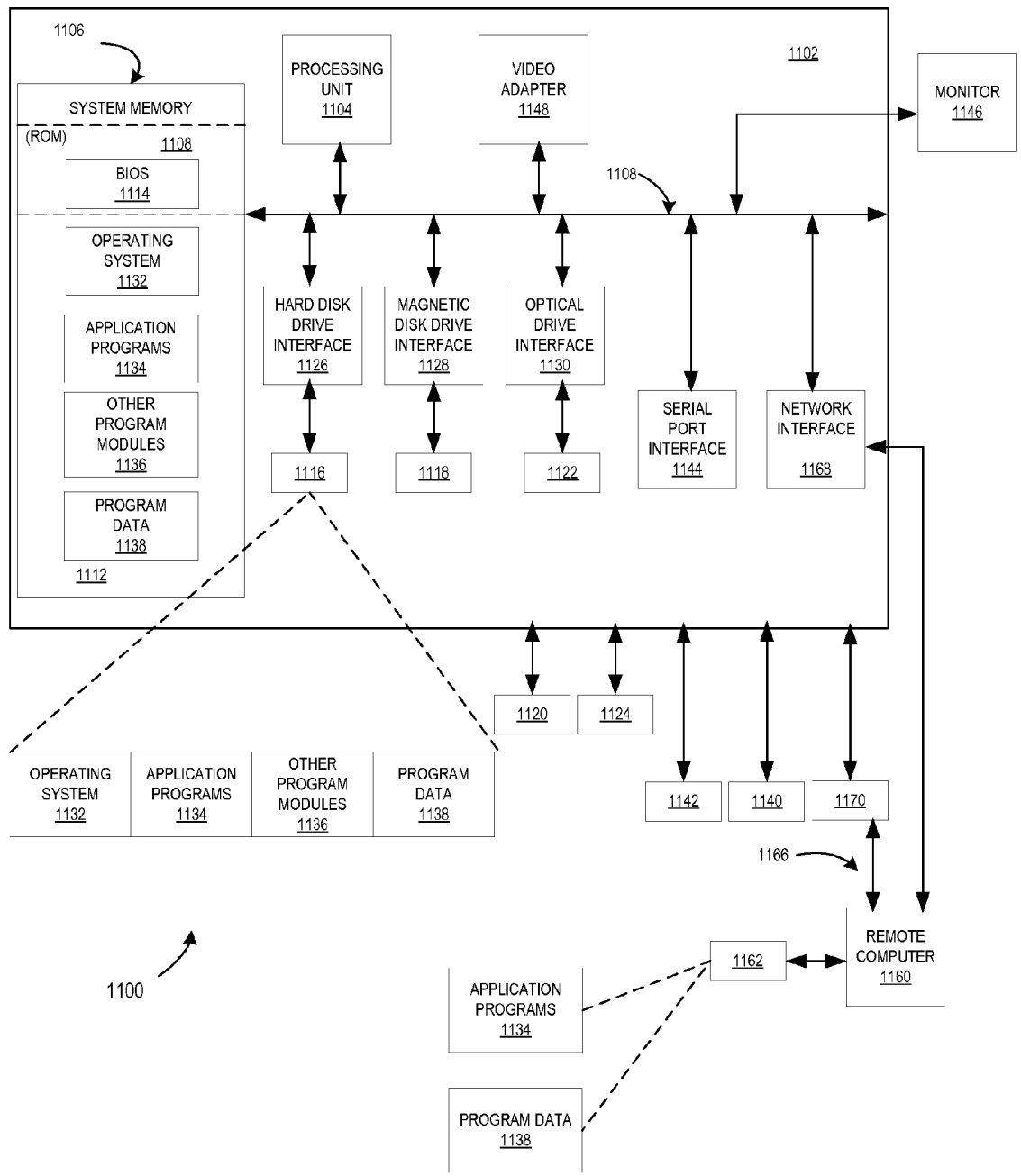
FIG. 11 is a block diagram illustrating an exemplary system environment for implementing various aspects of the invention.

FIG. 11 is a diagram illustrating an exemplary system environment 1100 configured to perform any one of the above-described processes. The system includes a conventional computer 1102. Computer 1102 may include circuitry or other specialized hardware for carrying out some or all aspects of the processes. In some operational settings, computer 1102 may be configured as a system that includes one or more units, each of which is configured to carry out some aspects of the processes either in software, hardware, or some combination thereof. In FIG. 11, computer 1102 includes a processing unit 1104, a system memory 1106, and a system bus 1108 that couples various system components, including the system memory, to the processing unit 1104. The processing unit 1104 may be any commercially available or proprietary processor. In addition, the processing unit may be implemented as multi-processor formed of more than one processor, such as may be connected in parallel.

The system bus 1108 may be any of several types of bus structure including a memory bus or memory controller, a peripheral bus, and a local bus using any of a variety of conventional bus architectures such as PCI, VESA, Microchannel, ISA, EISA, or the like. The system memory 1106 includes read only memory (ROM) 1110 and random access memory (RAM) 1112. A basic input/output system (BIOS) 1114, containing the basic routines that help to transfer information between elements within the computer 1102, such as during startup, is stored in ROM 1110.

The computer 1102 also may include, for example, a hard disk drive 1116, a magnetic disk drive 1118, e.g., to read from or write to a removable disk 1120, and an optical disk drive 1122, e.g., for reading from or writing to a CD-ROM disk 1124 or other optical media. The hard disk drive 1116, magnetic disk drive 1118, and optical disk drive 1122 are connected to the system bus 1108 by a hard disk drive interface 1126, a magnetic disk drive interface 1128, and an optical drive interface 1130, respectively. The drives 1116-1122 and their associated computer-readable media provide nonvolatile storage of data, data structures, computer-executable instructions, etc. for the computer 1102. Although the description of computer-readable media above refers to a hard disk, a removable magnetic disk and a CD, it should be appreciated by those skilled in the art that other types of media which are readable by a computer, such as magnetic cassettes, flash memory, digital video disks, Bernoulli cartridges, and the like, can also be used in the exemplary operating environment 1100, and further that any such media may contain computer-executable instructions for performing the methods of the embodiments.

At least some values based on the results of the above-described processes can be saved for subsequent use. The computer 1102 also may include, for example, a hard disk drive 1116, a magnetic disk drive 1118, e.g., to read from or write to a removable disk 1120, and an optical disk drive 1122, e.g., for reading from or writing to a CD-ROM disk 1124 or other optical media. The hard disk drive 1116, magnetic disk drive 1118, and optical disk drive 1122 are connected to the system bus 1108 by a hard disk drive interface 1126, a magnetic disk drive interface 1128, and an optical drive interface 1130, respectively. The drives 1116-1122 and their associated computer-readable media may provide non-volatile storage of data, data structures, computer-executable instructions, or the like, for the computer 1102. The computer program may be written, for example, in a general-purpose programming language (e.g., Pascal, C, C++, Java) or some specialized application-specific language. Although the description of computer-readable media above refers to a hard disk, a removable magnetic disk, and a CD, it should be appreciated by those skilled in the art that other types of media which are readable by a computer, such as magnetic cassettes, flash memory, digital video disks, Bernoulli cartridges, or the like, may also be used in the exemplary operating environment 1100, and further that any such media may contain computer-executable instructions for performing the methods of the embodiments.

A number of program modules may be stored in the drives 1116-1122 and RAM 1112, including an operating system 1132, one or more application programs 1134, other program modules 1136, and program data 1138. The operating system 1132 may be any suitable operating system or combination of operating systems. By way of example, the application programs 1134 and program modules 1136 may include, inter alia, an eye-tracking application, eye-tracking authentication application, client authentication application that communicates with an authentication server, functionalities that manage the authentication display elements, or the like. In some embodiments, application programs may include eye-tracking modules, facial recognition modules, parsers (e.g., natural language parsers), lexical analysis modules, text-messaging argot dictionaries, dictionaries, learning systems, or the like.

A user may enter commands and information into the computer 1102 through one or more user input devices, such as a keyboard 1140 and a pointing device (e.g., a mouse 1142). Other input devices (not shown) may include a camera, microphone, a game pad, a satellite dish, a wireless remote, a scanner, or the like. These and other input devices are often connected to the processing unit 1104 through a serial port interface 1144 that is coupled to the system bus 1108, but may be connected by other interfaces, such as a parallel port, a game port, or a universal serial bus (USB). A monitor 1146 or other type of display device is also connected to the system bus 1108 via an interface, such as a video adapter 1148. In addition to the monitor 1146, the computer 1102 may include other peripheral output devices (not shown), such as speakers, printers, etc.

It is to be appreciated that the computer 1102 may operate in a networked environment using logical connections to one or more remote computers 1160. The remote computer 1160 may be a workstation, a server computer, a router, a peer device, or other common network node, and typically includes many or all of the elements described relative to the computer 1102, although for purposes of brevity, only a memory storage device 1162 is illustrated in FIG. 11. The logical connections depicted in FIG. 11 may include a local area network (LAN) 1164 and a wide area network (WAN) 1166. Such networking environments are commonplace in offices, enterprise-wide computer networks, intranets, and the Internet.

When used in a LAN networking environment, for example, the computer 1102 is connected to the local network 1164 through a network interface or adapter 1168. When used in a WAN networking environment, the computer 1102 typically includes a modem (e.g., telephone, DSL, cable, etc.) 1170, is connected to an authentication server on the LAN, or has other means for establishing communications over the WAN 1166, such as the Internet. The modem 1170, which may be internal or external relative to the computer 1102, is connected to the system bus 1108 via the serial port interface 1144. In a networked environment, program modules (including application programs 1134) and/or program data 1138 may be stored in the remote memory storage device 1162. It will be appreciated that the network connections shown are exemplary and other means (e.g., wired or wireless) of establishing a communications link between the computers 1102 and 1160 may be used when carrying out an aspect of an embodiment.

In accordance with the practices of persons skilled in the art of computer programming, the embodiments have been described with reference to acts and symbolic representations of operations that are performed by a computer, such as the computer 1102 or remote computer 1160, unless otherwise indicated. Such acts and operations are sometimes referred to as being computer-executed. It will be appreciated that the acts and symbolically represented operations include the manipulation by the processing unit 1104 of electrical signals representing data bits, which causes a resulting transformation or reduction of the electrical signal representation, and the maintenance of data bits at memory locations in the memory system (including the system memory 1106, hard drive 1116, floppy disks 1120, CDROM 1124, and remote memory 1162) to thereby reconfigure or otherwise alter the computer system's operation, as well as other processing of signals. The memory locations where such data bits are maintained are physical locations that have particular electrical, magnetic, or optical properties corresponding to the data bits.

In some embodiments, system environment may include one or more sensors (not shown). In certain embodiments, a sensor may measure an attribute of a data environment, a computer environment, and a user environment, in addition to a physical environment. For example, in another embodiment, a sensor may also be a virtual device that measures an attribute of a virtual environment such as a gaming environment. Example sensors include, inter alia, global positioning system receivers, accelerometers, inclinometers, position sensors, barometers, WiFi sensors, RFID sensors, near-field communication (NFC) devices, gyroscopes, pressure sensors, pressure gauges, time pressure gauges, torque sensors, ohmmeters, thermometers, infrared sensors, microphones, image sensors (e.g., digital cameras), biosensors (e.g., photometric biosensors, electrochemical biosensors), an eye-tracking system (which may include digital camera(s), directable infrared lasers, accelerometers, or the like), capacitance sensors, radio antennas, heart rate sensors, galvanic skin response sensors, EMG devices, EEG devices, capacitance probes, cortisol sensors, blood sugar level sensors, or the like.

In some embodiments, the system environment 1100 of FIG. 11 may be modified to operate as a mobile device. In addition to providing voice communications functionality, mobile device 1100 may be arranged to provide mobile packet data communications functionality in accordance with different types of cellular radiotelephone systems. Examples of cellular radiotelephone systems offering mobile packet data communications services may include GSM with GPRS systems (GSM/GPRS), CDMA systems, Enhanced Data Rates for Global Evolution (EDGE) systems, EV-DO systems, Evolution Data and Voice (EV-DV) systems, High Speed Downlink Packet Access (HSDPA) systems, High Speed Uplink Packet Access (HSUPA), 3GPP Long-Term Evolution (LTE), and so forth. Such a mobile device may be arranged to provide voice and/or data communications functionality in accordance with different types of wireless network systems.

Examples of wireless network systems may include a wireless local area network (WLAN) system, wireless metropolitan area network (WMAN) system, wireless wide area network (WWAN) system, and so forth. Examples of suitable wireless network systems offering data communication services may include the Institute of Electrical and Electronics Engineers (IEEE) 802.xx series of protocols, such as the IEEE 802.11 a/b/g/n series of standard protocols and variants (also referred to as "WiFi"), the IEEE 802.16 series of standard protocols and variants (also referred to as "WiMAX"), the IEEE 802.20 series of standard protocols and variants, and so forth.

The mobile device may be arranged to perform data communications in accordance with different types of shorter-range wireless systems, such as a wireless personal area network (PAN) system. One example of a suitable wireless PAN system offering data communication services may include a Bluetooth system operating in accordance with the Bluetooth Special Interest Group series of protocols, including Bluetooth Specification versions v1.0, v1.1, v1.2, v2.0, or v2.0 with Enhanced Data Rate (EDR), as well as one or more Bluetooth Profiles, and so forth. Other examples may include systems using infrared techniques or near-field communication techniques and protocols, such as electromagnetic induction (EMI) techniques. An example of EMI technique may include passive or active radiofrequency identification (RFID) protocols and devices.

Short Message Service (SMS) messaging is a form of communication supported by most mobile telephone service providers and widely available on various networks including Global System for Mobile Communications (GSM), Code Division Multiple Access (CDMA), Time Division Multiple Access (TDMA), third-generation (3G) networks, and fourth-generation (4G) networks. Versions of SMS messaging are described in GSM specifications such as GSM specification 03.40 "Digital cellular telecommunications system (Phase 2+); Technical realization of the Short Message Service" and GSM specification 03.38 "Digital cellular telecommunications system (Phase 2+); Alphabets and language-specific information."

In general, SMS messages from a sender terminal may be transmitted to a Short Message Service Center (SMSC), which provides a store-and-forward mechanism for delivering the SMS message to one or more recipient terminals. Successful SMS message arrival may be announced by a vibration and/or a visual indication at the recipient terminal. In some cases, the SMS message may typically contain an SMS header including the message source (e.g., telephone number, message center, or email address) and a payload containing the text portion of the message. Generally, the payload of each SMS message is limited by the supporting network infrastructure and communication protocol to no more than 140 bytes which translates to 160 7-bit characters based on a default 128-character set defined in GSM specification 03.38, 140 8-bit characters, or 70 16-bit characters for languages such as Arabic, Chinese, Japanese, Korean, and other double-byte languages.

A long message having more than 140 bytes or 160 7-bit characters may be delivered as multiple separate SMS messages. In some cases, the SMS infrastructure may support concatenation allowing a long message to be sent and received as multiple concatenated SMS messages. In such cases, the payload of each concatenated SMS message is limited to 140 bytes but also includes a user data header (UDH) prior to the text portion of the message. The UDH contains segmentation information for allowing the recipient terminal to reassemble the multiple concatenated SMS messages into a single long message. In addition to alphanumeric characters, the text content of an SMS message may contain iconic characters (e.g., smiley characters) made up of a combination of standard punctuation marks such as a colon, dash, and open bracket for a smile.

Figure 12:
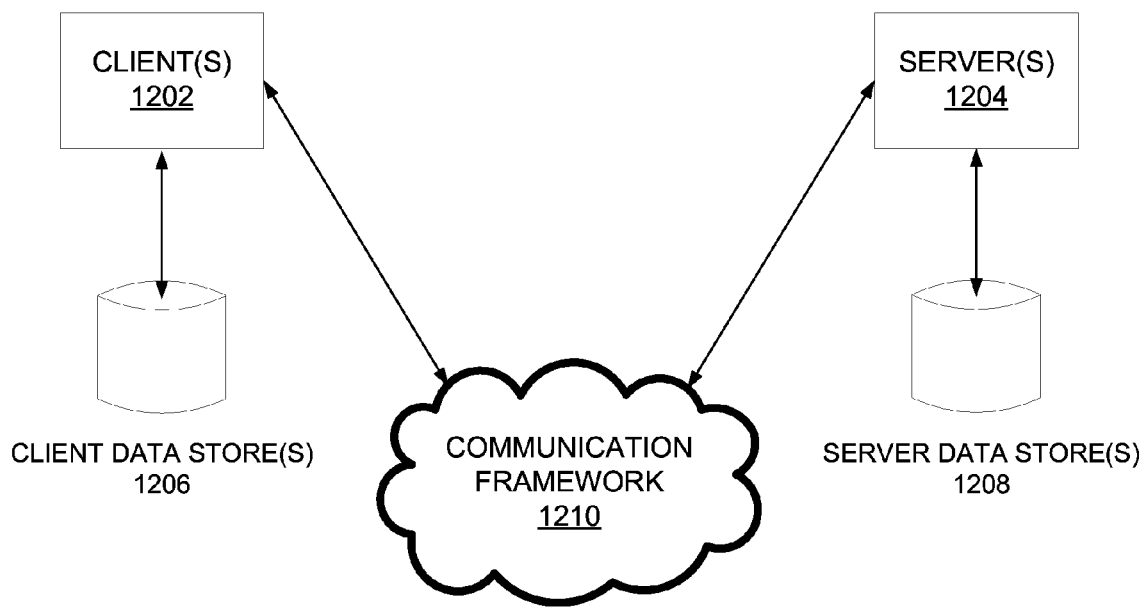
FIG. 12 is another block diagram illustrating components of an exemplary eye-tracking system according to some embodiments.

Multimedia Messaging (MMS) technology may provide capabilities beyond those of SMS and allow terminals to send and receive multimedia messages including graphics, video, and audio dips. Unlike SMS, which may operate on the underlying wireless network technology (e.g., GSM, CDMA, TDMA), MMS may use Internet-Protocol (IP) technology and be designed to work with mobile packet data services such as General Packet Radio Service (GPRS) and Evolution Data Only/Evolution Data Optimized FIG. 12 illustrates another block diagram of a sample computing environment 1200 with which embodiments may interact. System 1200 may include one or more clients 1202. The client(s) 1202 may be hardware and/or software (e.g., threads, processes, computing devices). The system 1200 also includes one or more servers 1204. The server(s) 1204 may also be hardware and/or software (e.g., threads, processes, computing devices). One possible communication between a client 1202 and a server 1204 may be in the form of a data packet adapted to be transmitted between two or more computer processes. The system 1200 includes a communication framework 1210 that may be employed to facilitate communications between the client(s) 1202 and the server(s) 1204. The client(s) 1202 are connected to one or more client data stores 1206 that may be employed to store information local to the client(s) 1202. Similarly, the server(s) 1204 are connected to one or more server data stores 1208 that may be employed to store information local to the server(s) 1204.

Figure 13:
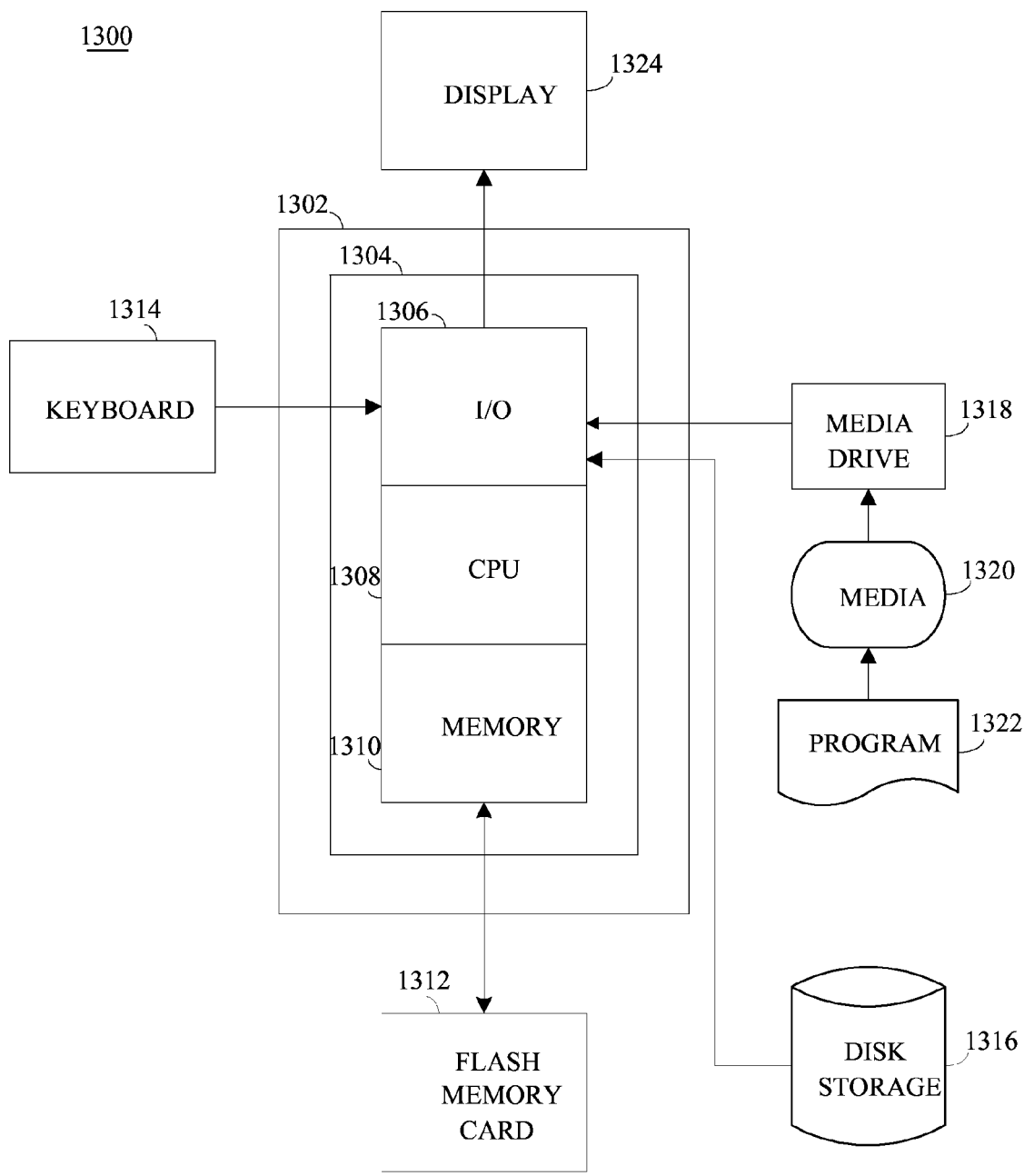
FIG. 13 is a block diagram illustrating an exemplary computing environment.

FIG. 13 illustrates another block diagram of a sample computing environment 1300 with which embodiments may interact. The system 1300 further illustrates a system that includes one or more clients 1302. The client(s) 1302 may be hardware and/or software (e.g., threads, processes, computing devices). The system 1300 also includes one or more servers 1304. The server(s) 1304 may also be hardware and/or software (e.g., threads, processes, computing devices). One possible communication between a client 1302 and a server 1304 may be in the form of a data packet adapted to be transmitted between two or more computer processes. The system 1300 includes a communication framework 1310 that may be employed to facilitate communications between the client(s) 1302 and the server(s) 1304. The client(s) 1302 are connected to one or more client data stores 1306 that may be employed to store information local to the client(s) 1302. Similarly, the server(s) 1304 are connected to one or more server data stores 1308 that may be employed to store information local to the server(s) 1304.

Although the present embodiments have been described with reference to specific example embodiments, various modifications and changes may be made to these embodiments without departing from the broader spirit and scope of the various embodiments. For example, the various devices, modules, etc., described herein may be enabled and operated using hardware circuitry, firmware, software, or any combination of hardware, firmware, and software (e.g., tangibly embodied in a machine-readable medium).

In addition, it will be appreciated that the various operations, processes, and methods disclosed herein may be embodied in a machine-readable medium and/or a machine-accessible medium compatible with a data processing system (e.g., a computer system), and may be performed in any order (e.g., including using means for achieving the various operations). Accordingly, the specification and drawings are to be regarded in an illustrative rather than a restrictive sense. In some embodiments, the machine-readable medium may be a non-transitory form of machine-readable medium.

What is claimed is:

1. A computer-implemented method of retrieving information regarding a sensory element experienced by a user according to bioresponse data, the method comprising:
   determining bioresponse data from the user while the user is experiencing a sensory stimulus including the sensory element;
   if the bioresponse data includes a pattern exceeding a threshold, then identifying, using the bioresponse data, the sensory element within the sensory stimulus and wherein the threshold comprises a initial period of time of 750 milliseconds, and wherein the threshold is increased to 950 milliseconds when the user exhibits an increased stress level;
   identifying an attribute of the sensory element, wherein the attribute describes the sensory element,
   associating the sensory element with the attribute.

2. The computer-implemented method of claim 1, wherein the pattern comprises a visual fixation on the sensory element.

3. The computer-implemented method of claim 1, further comprising:
wherein context data comprises a temperature of the physical environment in which the user experienced the sensory stimulus; and
storing the association of the sensory element with the attribute and the context data.

4. The computer-implemented method of claim 1, wherein the context data includes at least one of date, time, or user location.

5. The computer-implemented method of claim 3, wherein the context data includes at least one of a type, orientation, or acceleration of a device that is determining the bioresponse data.

6. The computer-implemented method of claim 3, further comprising:
receiving a search inquiry, wherein the search inquiry represents the attribute and the context data;
searching the stored associations using the search inquiry; and
displaying the sensory element based on the searching.

7. The computer-implemented method of claim 1, wherein the pattern is a visual regression on the sensory element, the visual regression comprising a number of fixations within a time period.

8. The computer-implemented method of claim 1, wherein the pattern is a visual saccadic pattern associated with the sensory element.

9. The computer-implemented method of claim 1, wherein:
the sensory element comprises an image in an HTML document, and
the attribute comprises a value of an HTML attribute of an HTML element associated with the sensory element.

10. The computer-implemented method of claim 1, wherein:
the sensory element is obtained from a web search, and the attribute describes the sensory element.

11. The computer-implemented method of claim 1, wherein the attribute is a name of a file containing the sensory element.

12. The computer-implemented method of claim 1, wherein the attribute is determined by applying an image recognition algorithm against at least of a portion of the sensory element.

13. The computer-implemented method of claim 1, wherein the sensory element is displayed on a screen of a digital computing device.

14. The computer-implemented method of claim 1, wherein the sensory element is displayed on a screen of a digital kiosk.

15. The computer-implemented method of claim 1, wherein the sensory element is visible to the eye of the user through an augmented reality goggle.

16. A computer-implemented method of retrieving, using bioresponse data, information regarding a sensory element experienced by a user, comprising:
receiving, from the user, a search query, wherein the search query includes at least one of date, time, location estimating the user's previous experience of the sensory element;
searching a repository of stored associations between the sensory element and the search query, wherein:
an association was stored based on bioresponse data determined from the user while the user was previously experiencing the sensory element,
the sensory element represents a portion of a sensory stimulus experienced by the user, and
the bioresponse data includes a pattern exceeding a threshold, and wherein the threshold comprises a initial period of time of 750 milliseconds, and wherein the threshold is increased to 950 milliseconds when the user exhibits an increased stress level; and
displaying the sensory element previously experienced by the user based on the searching.

17. A non-transitory computer-readable storage medium comprising computer-executable instructions for retrieving information regarding a sensory element experienced by a user according to bioresponse data, the computer-executable instructions comprising instructions for:
determining bioresponse data from the user while the user is experiencing a sensory stimulus including the sensory element, wherein the sensory element comprises a text element;
if the bioresponse data includes a pattern exceeding a threshold, then identifying, using the bioresponse data, the sensory element within the sensory stimulus, wherein the threshold is modified based on a stress level of the user, and wherein the threshold comprises a initial period of time of 750 milliseconds, and wherein the threshold is increased to 950 milliseconds when the user exhibits an increased stress level;
identifying an attribute of the sensory element, wherein the attribute describes the sensory element, wherein the attribute comprises a dictionary definition of at least a portion of the text element;
identifying a context data, wherein the context data identifies a physical environment in which the user experienced the sensory stimulus; and
associating the sensory element with the attribute and the context data; and
storing the association of the sensory element with the attribute.

18. The non-transitory computer-readable medium of claim 17, wherein the pattern comprises a visual fixation on the sensory element.

19. The non-transitory computer-readable medium of claim 17, further comprising:
wherein context data comprises a temperature of the physical environment in which the user experienced the sensory stimulus; and
storing the association of the sensory element with the attribute and the context data.

20. The non-transitory computer-readable medium of claim 17, wherein the context data includes at least one of date, time, or user location.

21. The non-transitory computer-readable medium of claim 19, wherein the context data includes at least one of a type, orientation, or acceleration of a device that is determining the bioresponse data.

22. The non-transitory computer-readable medium of claim 19, further comprising:
receiving a search inquiry, wherein the search inquiry represents attribute or context data;
searching the stored associations using the search inquiry; and
displaying the sensory element based on the searching.

23. The non-transitory computer-readable medium of claim 17, wherein the pattern is a visual regression on the sensory element, the visual regression comprising a number of fixations within a time period.

24. The non-transitory computer-readable medium of claim 17, wherein the pattern is a visual saccadic pattern associated with the sensory element.

25. The non-transitory computer-readable medium of claim 17, wherein:
the sensory element comprises an image in an HTML document, and
the attribute comprises a value of an HTML attribute of an HTML element associated with the sensory element.

26. The non-transitory computer-readable medium of claim 17, wherein:
the sensory element is obtained from a web search, and the attribute describes the sensory element.

27. The non-transitory computer-readable medium of claim 17, wherein the attribute is a name of a file containing the sensory element.

28. The non-transitory computer-readable medium of claim 17, wherein the attribute is determined by applying an image recognition algorithm against at least of a portion of the sensory element.

29. The non-transitory computer-readable medium of claim 17, wherein the sensory element includes text, and the attribute is a dictionary definition of at least a portion of the text.

30. The non-transitory computer-readable medium of claim 17, wherein the sensory element is displayed on a screen of a digital computing device.

31. The non-transitory computer-readable medium of claim 17, wherein the sensory element is displayed on a screen of a digital kiosk.

32. The non-transitory computer-readable medium of claim 17, wherein the sensory element is visible to the eye of the user through an augmented reality goggle.

33. A non-transitory computer-readable storage medium comprising computer-executable instructions for retrieving, using bioresponse data, information regarding a sensory element experienced by a user, the computer-executable instructions comprising instructions for:
receiving, from the user, a search query, wherein the search query includes at least one of date, time, location estimating the user's previous experience of the sensory element;
searching a repository of stored associations between the sensory element and the search query, wherein:
an association was stored based on bioresponse data determined from the user while the user was previously experiencing the sensory element,
the sensory element represents a portion of a sensory stimulus experienced by the user, and
the bioresponse data includes a pattern exceeding a threshold, and wherein the threshold comprises a initial period of time of 750 milliseconds, and wherein the threshold is increased to 950 milliseconds when the user exhibits an increased stress level; and
displaying the sensory element previously experienced by the user based on the searching.

34. A computer system for retrieving information regarding a sensory element experienced by a user according to bioresponse data, comprising:
one or more sensors configured to determine bioresponse data from the user while the user is experiencing a sensory stimulus including the sensory element, wherein the bioresponse data comprises eye-tracking data that indicates a comprehension difficulty on the part of the user with respect to the sensory stimulus, and wherein the sensory stimulus comprises text; and
one or more processors configured to:
identify, using the bioresponse data, the sensory element within the sensory stimulus, if the bioresponse data includes a pattern exceeding a threshold and wherein the threshold comprises a initial period of time of 750 milliseconds, and wherein the threshold is increased to 950 milliseconds when the user exhibits an increased stress level;
identify an attribute of the sensory element, wherein the attribute describes the sensory element;
identify, using the bioresponse data, context data, wherein the context data identifies the physical environment in which the user experienced the sensory stimulus;
associate the sensory element with the attribute and the context data; and
store the association into memory.

35. A computer system for retrieving, using bioresponse data, information regarding a sensory element experienced by a user, comprising:
memory storing associations between the sensory element and related information, wherein:
an association was stored based on bioresponse data determined from the user while the user was previously experiencing the sensory element,
the sensory element represents a portion of a sensory stimulus experienced by the user, and
the bio response data includes a pattern exceeding a threshold, wherein the threshold is modified based on a stress level of the user, and wherein the threshold comprises a initial period of time of 750 milliseconds, and wherein the threshold is increased to 950 milliseconds when the user exhibits an increased stress level; and
one or more processors configured to:
receive, from the user, a search query, wherein the search query includes at least one of date, time, location estimating the user's previous experience of the sensory element;
search the memory based on the search query; and
cause to be displayed the sensory element previously experienced by the user based on the searching.

* * * * *